US012162339B2

(12) United States Patent
Bartz et al.

(10) Patent No.: US 12,162,339 B2
(45) Date of Patent: Dec. 10, 2024

(54) YOUTH ELECTRIC VEHICLE

(71) Applicant: Polaris Industries Inc., Medina, MN (US)

(72) Inventors: Austin R. Bartz, Forest Lake, MN (US); Chiao George Liu, White Bear Lake, MN (US); Scott D. Taylor, Blaine, MN (US); Kyle J. Schounard, Osceola, WI (US); William B. Rodriguez, Roseau, MN (US); Yassin M. Kelay, Freiburg (CH); David F. Buehler, Bern (CH); John M. Nutter, Stacy, MN (US); Lindsay S B Edwards, Roseau, MN (US); Joseph A. Wegleitner, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 29 days.

(21) Appl. No.: 17/587,721

(22) Filed: Jan. 28, 2022

(65) Prior Publication Data
US 2022/0242213 A1    Aug. 4, 2022

Related U.S. Application Data

(60) Provisional application No. 63/143,240, filed on Jan. 29, 2021.

(51) Int. Cl.
*B60K 1/00*      (2006.01)
*B60G 9/00*      (2006.01)
(Continued)

(52) U.S. Cl.
CPC .................. *B60K 1/00* (2013.01); *B60G 9/00* (2013.01); *B60G 17/015* (2013.01); *B60K 1/04* (2013.01);
(Continued)

(58) Field of Classification Search
CPC . B60K 1/00; B60K 1/04; B60K 26/02; B60K 2001/0405; B60K 2001/0416;
(Continued)

(56) References Cited

U.S. PATENT DOCUMENTS 4,655,724 A * 4/1987 Law ...................... A63H 31/00
                                                              180/6.66
6,952,060 B2 * 10/2005 Goldner ............. B60G 17/0157
                                                              310/15

(Continued)

FOREIGN PATENT DOCUMENTS

CN      109018096 A  * 12/2018
CN      110816286 A  *  2/2020  ................ B60L 1/00
(Continued)

OTHER PUBLICATIONS

International Search Report and Written Opinion received for PCT Patent Application No. PCT/US2022/014205, mailed on Apr. 12, 2022, 14 pages.

*Primary Examiner* — James A Shriver, II
*Assistant Examiner* — Michael T. Walsh
(74) *Attorney, Agent, or Firm* — Faegre Drinker Biddle & Reath LLP

(57) ABSTRACT

Embodiments of the present disclosure relate to youth electric recreational vehicles. In an exemplary embodiment, a youth recreational vehicle, comprises: one or more front ground engaging members, one or more rear ground engaging members, and a frame supported by the one or more front ground engaging members and the one or more rear ground engaging members. In addition, the youth recreational vehicle comprises a seat supported by the frame and configured to support at least one rider and an electric powertrain. The electric powertrain is configured to drive at least one of: (i) the one or more front ground engaging members and (ii) the one or more rear ground engaging
(Continued)

members. The electric powertrain comprises: a controller, at least one electric motor, and at least one battery pack.

27 Claims, 16 Drawing Sheets

(51) Int. Cl.
*B60G 17/015* (2006.01)
*B60K 1/04* (2019.01)
*B60K 26/02* (2006.01)
*B60L 15/20* (2006.01)
*B60L 58/12* (2019.01)
*B60Q 9/00* (2006.01)
*B62D 1/02* (2006.01)

(52) U.S. Cl.
CPC .............. *B60K 26/02* (2013.01); *B60L 15/20* (2013.01); *B60L 58/12* (2019.02); *B60Q 9/00* (2013.01); *B62D 1/02* (2013.01); *B60G 2300/13* (2013.01); *B60G 2300/50* (2013.01); *B60K 2001/0405* (2013.01); *B60K 2001/0416* (2013.01)

(58) Field of Classification Search
CPC ...... B60K 2001/001; B60K 2001/0422; B60K 2001/0455; B60K 2026/025; B60K 2001/0461; B60K 2026/028; B60G 9/00; B60G 17/015; B60G 2300/13; B60G 2300/50; B60G 13/14; B60G 2300/60; B60L 15/20; B60L 58/12; B60L 2200/22; B60L 50/66; B60L 53/30; B60Q 9/00; B62D 1/02; B60Y 2200/124; B60Y 2200/20; Y02T 10/70
See application file for complete search history.

(56) References Cited

U.S. PATENT DOCUMENTS

| | | | | |
|---|---|---|---|---|
| 7,407,031 B2 * | 8/2008 | Hayashi | .................... | B62K 5/01 |
| | | | | 180/311 |
| 7,708,106 B1 * | 5/2010 | Bergman | .................. | B60G 7/02 |
| | | | | 180/349 |
| 7,950,491 B2 * | 5/2011 | Isoda | ........................ | B62K 5/01 |
| | | | | 180/311 |
| 8,678,976 B1 * | 3/2014 | Wilson | ................ | B60W 50/082 |
| | | | | 477/35 |
| 8,874,291 B2 * | 10/2014 | Gresser | ..................... | B60L 8/00 |
| | | | | 180/65.265 |
| 8,973,691 B2 * | 3/2015 | Morgan | ................. | B60K 20/08 |
| | | | | 180/68.5 |
| 9,067,484 B2 * | 6/2015 | Zhao | ......................... | B60K 1/00 |
| 9,085,341 B2 * | 7/2015 | Tsai | ......................... | B62M 6/45 |
| 9,284,012 B2 * | 3/2016 | Figueroa | ................... | B62K 5/01 |
| 2001/0027890 A1 * | 10/2001 | Bria | ......................... | B62K 5/027 |
| | | | | 180/312 |
| 2007/0194553 A1 | 8/2007 | Czysz | | |
| 2010/0219641 A1 | 9/2010 | Namuduri et al. | | |
| 2011/0025008 A1 | 2/2011 | Grossman | | |
| 2014/0214242 A1 | 7/2014 | Seo et al. | | |
| 2015/0122570 A1 | 5/2015 | Miyashiro | | |
| 2017/0136875 A1 * | 5/2017 | Logan | ..................... | H04W 4/80 |
| 2017/0259879 A1 * | 9/2017 | Southey | ................... | B62J 43/20 |
| 2018/0141543 A1 | 5/2018 | Krosschell et al. | | |
| 2023/0192232 A1 * | 6/2023 | Osawa | ..................... | B60K 1/00 |
| | | | | 180/292 |

FOREIGN PATENT DOCUMENTS

| | | | | |
|---|---|---|---|---|
| CZ | 9900708 A3 * | 10/2000 | ............... | B60N 2/01 |
| JP | H0572552 U * | 10/1993 | | |
| JP | H0699750 A * | 4/1994 | | |
| JP | 2007502232 A * | 2/2007 | | |
| JP | 2018145698 A * | 9/2018 | | |
| KR | 102281641 B1 * | 7/2021 | | |
| WO | WO-9906159 A1 * | 2/1999 | ............... | B60K 1/00 |
| WO | 2020/160406 A1 | 8/2020 | | |

* cited by examiner

POLARIS ~10%

POLARIS

POLARIS

POLARIS ~50%

POLARIS

POLARIS

POLARIS ~100%

Fig. 16

YOUTH ELECTRIC VEHICLE

RELATED APPLICATIONS

The present disclosure claims the benefit of U.S. Provisional Patent Application No. 63/143,240, filed Jan. 29, 2021, titled YOUTH ELECTRIC VEHICLE, the entire disclosures of which are expressly incorporated by reference herein.

TECHNICAL FIELD

Embodiments of the present disclosure relate to recreational vehicles. More particularly, embodiments of the present disclosure relate to youth electric recreational vehicles.

BACKGROUND

Generally, a parent would like the opportunity to monitor a youth's use of a recreational vehicle to prevent the youth from entering into dangerous or difficult situations. Further, as a youth grows in size and maturity, the recreational vehicle needs of the youth changes.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a youth electric vehicle. Example embodiments include, but are not limited to the following embodiments.

In example embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; and an electric powertrain configured to drive at least one of: (i) the one or more front ground engaging members and (ii) the one or more rear ground engaging members, the electric powertrain comprising: a controller, at least one electric motor, and at least one battery pack.

In an example thereof, the electric motor is an axial flux electric motor.

In an example thereof, the at least one battery pack is arranged proximal a center portion of the frame.

In an example thereof, the at least one battery pack is arranged proximal the one or more rear ground engaging members.

In an example thereof, the at least one battery pack is accessible via a lockable access panel.

In an example thereof, the controller is configured to: receive a signal from a user device to stop power output of the at least one electric motor; and send a signal to the electric motor to stop outputting power in response to a throttle signal.

In an example thereof, the youth recreational vehicle further comprises a docking station releasably coupled to the youth recreational vehicle, wherein the docking station receives a first power output from the at least one battery pack and converts the first power output to a second power output that can be used by an accessory device.

In an example thereof, the youth recreational vehicle further comprises: a front suspension coupled to the one or more front ground engaging members; a rear suspension to the one or more rear ground engaging members; and wherein the front suspension, the rear suspension, or the front suspension and the rear suspension are configure to send an electromotive force to the battery pack in response to (i) the one or more front ground engaging members moving in an upward or downward direction and/or (ii) the one or more rear ground engaging members moving in an upward or downward direction.

In an example thereof, the youth recreational vehicle further comprises an electronic throttle control configured to send a throttle signal to the controller in response to a user activating the throttle.

In an example thereof, the at least one battery pack comprises configurable battery modules.

In an example thereof, the controller is configured to send a signal to the at least one motor to disengage in response to receiving a freewheel signal.

In an example thereof, the controller is further configured to: receive a tether signal indicating a user has released at least one of the user's hands from the steering assembly; and send a signal to the at least one motor to disengage so the at least one motor no longer outputs power.

In an example thereof, the controller is further configured to: receive a charge signal from the at least one battery pack corresponding to a charge level of the battery pack; and transmit a signal to a user device corresponding to the charge level of the battery pack.

In an example thereof, the controller is further configured to: receive a power output signal from a user device; and configured a maximum power output of the at least one electric motor based upon the received power output signal.

In an example thereof, the youth recreational vehicle further comprises: a steering assembly configured to control a direction of the one or more front ground engaging members; at least one of a footwell or pegs arranged on each side of the youth recreational vehicle; and wherein at least one of the following is translatable in a horizontal direction, a vertical direction, and/or a diagonal direction: the steering assembly, the seat, the footwells, and the pegs.

In an example thereof, the one or more front ground engaging members and the one or more rear ground engaging members are swappable with larger diameter or smaller diameter ground engaging members.

In an example thereof, the youth recreational vehicle further comprises: a front suspension coupled to the one or more front ground engaging members; a rear suspension to the one or more rear ground engaging members; and wherein the front suspension, the rear suspension, or both the front suspension and the rear suspension are swappable with stiffer or more flexible suspensions.

In an example thereof, the controller is further configured to: receive a charge signal from the at least one battery pack corresponding to a charge level of the battery pack; determine the charge level is at or below a first threshold; send a signal to the at least one motor to operate at a first operating level; and provide a notification to a user device that the charge level is at least or below the first threshold.

In an example thereof, the controller is further configured to: receive a charge signal from the at least one battery pack corresponding to a charge level of the battery pack; determine the charge level is at or below a second threshold; send a signal to the at least one motor to operate at a second operating level, wherein the second operating level produces a lower max power output than the first operating level; and provide a notification to the user device that the charge level is at least or below the second threshold.

In an example thereof, the controller is further configured to: receive a charge signal from the at least one battery pack corresponding to a charge level of the battery pack; determine the charge level is at or below a third threshold; and send a signal to the at least one motor to stop power output of the at least one motor.

In an example thereof, the controller is further configured to: receive an authorization signal from the user device; and send a signal to the at least one motor to operate at a second operating level.

In an example thereof, the electric powertrain is scalable.

In an example thereof, the youth recreational vehicle is a side-by-side.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; and an electric powertrain configured to drive at least one of: (i) the one or more front ground engaging members and (ii) the one or more rear ground engaging members, the electric powertrain comprising: a controller, at least one electric motor, and at least one battery pack, wherein the electric motor is an axial flux electric motor.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; and an electric powertrain configured to drive at least one of: (i) the one or more front ground engaging members and (ii) the one or more rear ground engaging members, the electric powertrain comprising: a controller, at least one electric motor, and at least one battery pack, wherein the at least one battery pack is arranged proximal a center portion of the frame.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; and an electric powertrain configured to drive at least one of: (i) the one or more front ground engaging members and (ii) the one or more rear ground engaging members, the electric powertrain comprising: a controller, at least one electric motor, and at least one battery pack, wherein the at least one battery pack is arranged proximal the one or more rear ground engaging members.

In another exemplary embodiment, a youth recreational vehicle, comprises: one or more front ground engaging members; one or more rear ground engaging members; a frame supported by the one or more front ground engaging members and the one or more rear ground engaging members; an outer body covering at least a portion of the frame; a seat supported by the frame and configured to support at least one rider; and an electric powertrain configured to drive at least one of: (i) the one or more front ground engaging members and (ii) the one or more rear ground engaging members, the electric powertrain comprising: a controller, at least one electric motor, and at least one battery pack, wherein the at least one battery pack is accessible via a lockable access panel.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; and an electric powertrain configured to drive at least one of: (i) the one or more front ground engaging members and (ii) the one or more rear ground engaging members, the electric powertrain comprising: a controller, at least one electric motor, and at least one battery pack, wherein the controller is configured to: receive a signal from a user device to stop power output of the at least one electric motor; and send a signal to the electric motor to stop outputting power in response to a throttle signal.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; an electric powertrain configured to drive at least one of: (i) the one or more front ground engaging members and (ii) the one or more rear ground engaging members, the electric powertrain comprising: a controller, at least one electric motor, and at least one battery pack; and a docking station releasably coupled to the youth recreational vehicle, wherein the docking station receives a first power output from the at least one battery pack and converts the first power output to a second power output that can be used by an accessory device.

In another exemplary embodiment, a youth recreational vehicle, comprises: one or more front ground engaging members; a front suspension coupled to the one or more front ground engaging members; one or more rear ground engaging members; a rear suspension to the one or more rear ground engaging members; a frame supported by the front suspension and the rear suspension; a seat supported by the frame and configured to support at least one rider; and an electric powertrain configured to drive at least one of: (i) the one or more front ground engaging members and (ii) the one or more rear ground engaging members, the electric powertrain comprising a controller, at least one electric motor, and at least one battery pack, wherein the front suspension, the rear suspension, or the front suspension and the rear suspension are configure to send an electromotive force to the battery pack in response to (i) the one or more front ground engaging members moving in an upward or downward direction and/or (ii) the one or more rear ground engaging members moving in an upward or downward direction.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; an electric powertrain configured to drive at least one of: (i) the one or more front ground engaging members and (ii) the one or more rear ground engaging members, the electric powertrain comprising a controller, at least one electric motor, and at least one battery pack; and an electronic throttle control configured to send a throttle signal to the controller in response to a user activating the throttle.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; an electric powertrain configured to drive at least one of: (i) the one or more front ground engaging members and (ii) the one or more rear ground engaging members, the electric powertrain comprising: a controller, at least one electric motor, and at least one battery pack, wherein the at least one battery pack comprises configured battery modules.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; an electric powertrain configured to drive at least one of: (i) the one or more front ground engaging members and (ii) the one or more rear ground engaging members, the electric powertrain comprising: a controller, at least one electric motor, and at least one battery pack, wherein the controller is configured to send a signal to the at least one motor to disengage in response to receiving a freewheel signal.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; a steering assembly configured to control the direction of the one or more front ground engaging members; and an electric powertrain configured to drive at least one of: (i) the one or more front ground engaging members and (ii) the one or more rear ground engaging members, the electric powertrain comprising: a controller, at least one electric motor, and at least one battery pack, wherein the controller is configured to: receive a tether signal indicating a user has released at least one of the user's hands from the steering assembly; and send a signal to the at least one motor to disengage so the at least one motor no longer outputs power.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; an electric powertrain configured to drive at least one of: (i) the one or more front ground engaging members and (ii) the one or more rear ground engaging members, the electric powertrain comprising: a controller, at least one electric motor, and at least one battery pack, wherein the controller is configured to: receive a charge signal from the at least one battery pack corresponding to a charge level of the battery pack; and transmit a signal to a user device corresponding to the charge level of the battery pack.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; an electric powertrain configured to drive at least one of: (i) the one or more front ground engaging members and (ii) the one or more rear ground engaging members, the electric powertrain comprising: a controller, at least one electric motor, and at least one battery pack, wherein the controller is configured to: receive a power output signal from a user device; and configured a maximum power output of the at least one electric motor based upon the received power output signal.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; a steering assembly configured to control a direction of the one or more front ground engaging members; at least one of a footwell or pegs arranged on each side of the youth recreational vehicle; an electric powertrain configured to drive at least one of: (i) the one or more front ground engaging members and (ii) the one or more rear ground engaging members, the electric powertrain comprising: a controller, at least one electric motor, and at least one battery pack, wherein at least one of the following is translatable in a horizontal direction, a vertical direction, and/or a diagonal direction: the steering assembly, the seat, the footwells, and the pegs.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; an electric powertrain configured to drive at least one of: (i) the one or more front ground engaging members and (ii) the one or more rear ground engaging members, the electric powertrain comprising: a controller, at least one electric motor, and at least one battery pack, wherein the one or more front ground engaging members and the one or more rear ground engaging members are swappable with larger diameter or smaller diameter ground engaging members.

In another exemplary embodiment, a youth recreational vehicle, comprises: one or more front ground engaging members; a front suspension coupled to the one or more front ground engaging members; one or more rear ground engaging members; a rear suspension to the one or more rear ground engaging members; a frame supported by the front suspension and the rear suspension; a seat supported by the frame and configured to support at least one rider; an electric powertrain configured to drive at least one of: (i) the one or more front ground engaging members and (ii) the one or more rear ground engaging members, the electric powertrain comprising: a controller, at least one electric motor, and at least one battery pack, wherein the front suspension, the rear suspension, or both the front suspension and the rear suspension are swappable with stiffer or more flexible suspensions.

In another exemplary embodiment, a youth recreational vehicle, comprises: one or more front ground engaging members; one or more rear ground engaging members; a frame supported by the one or more front ground engaging members and the one or more rear ground engaging members; a seat supported by the frame and configured to support at least one rider; an electric powertrain configured to drive at least one of: (i) the one or more front ground engaging members and (ii) the one or more rear ground engaging members, the electric powertrain comprising: a controller, at least one electric motor, and at least one battery pack, wherein the controller is configured to: receive a charge signal from the at least one battery pack corresponding to a charge level of the battery pack; determine the charge level is at or below a first threshold; send a signal to the at least one motor to operate at a first operating level; and provide a notification to a user device that the charge level is at least or below the first threshold.

In an example thereof, the controller is further configured to: receive a charge signal from the at least one battery pack corresponding to a charge level of the battery pack; determine the charge level is at or below a second threshold; send a signal to the at least one motor to operate at a second operating level, wherein the second operating level produces a lower max power output than the first operating level; and provide a notification to the user device that the charge level is at least or below the second threshold.

In an example thereof, the controller is further configured to: receive a charge signal from the at least one battery pack corresponding to a charge level of the battery pack; determine the charge level is at or below a third threshold; and send a signal to the at least one motor to stop power output of the at least one motor.

In an example thereof, the controller is further configured to: receive an authorization signal from the user device; and send a signal to the at least one motor to operate at a second operating level.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 16 is an illustration of a logo indicating different levels of charge, in accordance with embodiments of the present disclosure.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Examples of all-terrain vehicles (ATVs) are disclosed in U.S. patent application Ser. No. 15/205,601, titled ALL-TERRAIN VEHICLE, filed Jul. 8, 2016, U.S. Pat. No. 9,873,316, titled ALL-TERRAIN VEHICLE, filed Mar. 13, 2014, U.S. Pat. No. 8,122,993, titled POWER STEERING FOR AN ALL TERRAIN VEHICLE, filed Aug. 14, 2008, and/or U.S. Pat. No. 8,215,694, titled ATV HAVING ARRANGEMENT FOR A PASSENGER, filed Oct. 7, 2008, the entire disclosures of which are incorporated herein by reference.

Figure 1:
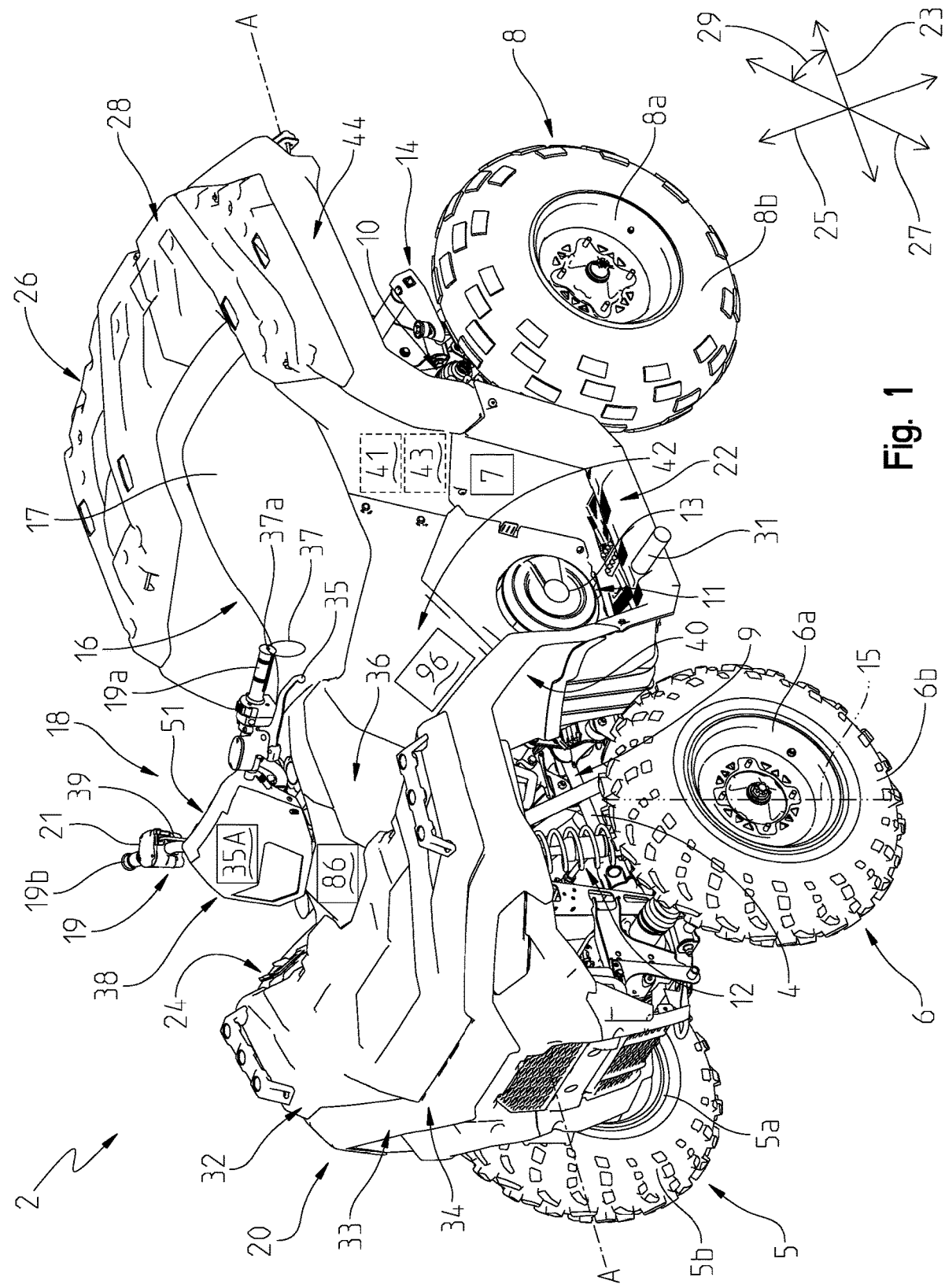
FIG. 1 is a left front perspective view of an example youth recreational vehicle, in accordance with certain embodiments of the present disclosure.

FIG. 1 is a left front perspective view of an example youth recreational vehicle 2, in accordance with certain embodiments of the present disclosure. However, this diagram is merely an example, which should not unduly limit the scope of the claims. One of ordinary skill in the art would recognize many variations, alternatives, and modifications.

In this example, the youth recreation vehicle 2 is a youth all-terrain vehicle (ATV). However, other examples of youth recreational vehicles include, but are not limited to, a youth side-by-side (SxS) vehicle, a youth motorcycle, a youth slingshot (SLG), a youth tricycle, a youth snowmobile, and/or a youth watercraft.

As illustrated, the youth recreational vehicle 2 includes a frame 4 coupled to and supported by front ground-engaging members 6 and rear ground-engaging members 8. Youth recreational vehicle 2 travels relative to a ground surface on front ground-engaging members 6 and rear ground-engaging members 8. Front ground-engaging members 6 include wheels 6a and tires 6b, and rear ground-engaging members 8 include wheels 8a and tires 8b.

Battery Security

Youth recreational vehicle 2 includes an electric motor 10 powered by a battery pack 9. In certain aspects, the battery pack 9 includes one or more battery modules 9a, 9b (shown in FIG. 2). In certain aspects, the electric motor 10 and/or the battery pack 9 are accessible via an access panel 11. Via the access panel 11, battery pack 9 may be configurable to produce different voltages and/or currents. For example, one or more battery modules 9a, 9b, 9c may be added, removed, configured to be run in series or parallel to produce different voltages and/or currents, as explained in more detail below. As such, the youth recreational vehicle 2 can be used for different size youths and/or for different applications such as high power, short duration use cases, medium power, medium duration use cases, and/or low power, long duration use cases. Other additional aspects of the electric motor 10 and the battery pack 9 are described in more detail below.

In certain examples, the access panel 11 includes a lock 13 for locking the access panel 11. The lock 13 may be locked and/or unlocked using a key, passcode, and/or via a user device (e.g., user device 88 illustrated in FIGS. 4, 8, and 9). Due to the aspects described below related to being able to switch out battery modules 9a, 9b and/or add battery module 9c, the lock 13 prevents unauthorized tempering and/or theft of the battery modules 9a, 9b, 9c.

Front ground-engaging members 6 are coupled to frame 4 by way of a front suspension 12, and rear ground-engaging members 8 are coupled to frame 4 by way of a rear suspension 14. In certain aspects, the front and rear suspensions 12, 14 allow for different size ground-engaging members 6, 8 to be installed on the youth recreational vehicle 2. As such, when a youth begins using the youth recreational vehicle 2, ground-engaging members 6, 8 having a smaller diameter 15 can be installed on the youth recreational vehicle 2. Then, as the youth grows, ground-engaging members 6, 8 having a larger diameter 15 can be installed. In certain aspects, the front and rear suspension 12, 14 can also be modified and/or replaced to increase the stiffness of the front and rear suspension 12, 14 to accommodate a heavier rider. In certain aspects, when the ground-engaging members 6, 8 are switched with larger and/or smaller ground-engaging members 6, 8, a user can calibrate the youth recreational vehicle 2 to the larger and/or smaller ground-engaging members 6, 8 by selecting the appropriate diameter of the ground-engaging members 6, 8 via a website and/or application (e.g., the youth vehicle application 114) installed on a user device 88.

Once an appropriate diameter of the ground-engaging members 6, 8 is selected, the controller 86 can remap the throttle 21 characteristics to maintain similar drivability and maximum speed across different ground-engaging members 6, 8 diameters. In some examples, the controller 86 can limit the current output of the battery pack 9 to limit the maximum torque output and/or limit the voltage output of the battery pack 9 to limit the maximum speed. As an example, the controller 86 can limit the torque output when actuated to prevent the ground-engaging members 6, 8 from slipping in the event the diameter of recently installed ground-engaging members 6, 8 is smaller than the diameter of ground-engaging members 6, 8 that were previous installed and vice-versa for ground-engaging members 6, 8 having a larger diameter. As another example, the throttle 21 may generate a lower maximum rotational speed of the ground-engaging members 6, 8 in the event the diameter of recently installed ground-engaging members 6, 8 is larger than the diameter of ground-engaging members 6, 8 that were previous installed and vice-versa for ground-engaging members 6, 8 having a smaller diameter.

In some embodiments, a supervising person (e.g., a parent) can select a maximum speed and/or maximum acceleration via a user interface 115 (illustrated in FIG. 9) of the youth recreational vehicle 2 and the controller 86 will automatically configure the throttle 21 characteristics and/or the configuration of the battery pack 9, such as the torque, maximum rotational speed, etc. based on the selected maximum speed and/or maximum acceleration. As a result, a supervising person can adjust the maximum speed and/or maximum acceleration based on the youth's skill level. As another example, a supervising person can select a pre-defined category for a youth that will use the youth recreational vehicle 2. In response, the controller 86 can automatically configure the maximum acceleration and/or maximum speed of the youth recreational vehicle 2 based on the selected pre-defined category. In some examples, the pre-defined category can include different age range groups, e.g., youth rider that is younger than 6 years old, a youth rider that between 6 years old and 10 years old, and/or a youth rider between 10 years old and 14 years old. However, these are only examples and not meant to be limiting. Other age ranges are considered and within the ambit of the present disclosure. Additionally, or alternatively, the pre-defined category can include the skill of the rider, such as novice, intermediate, and/or advanced. In some embodiments, the maximum speed and/or maximum acceleration can be password protected so that only a supervising person can change the maximum speed and/or maximum acceleration. Additionally, or alternatively, other manual calibrations of top speed and acceleration may be allowed via, e.g., a user interface 115 (illustrated in FIG. 9 below). Additionally, or alternatively, when the front and rear suspension 12, 14 is switched with stiffer and/or more flexible front and rear suspensions 12, 14, a user can calibrate the youth recreational vehicle 2 by selecting the appropriate front and rear suspensions 12, 14 via a website and/or youth vehicle application 114 installed on a user device 88.

Because the ground-engaging members 6, 8 are interchangeable with larger and/or smaller ground-engaging members 6, 8 and/or because the front and rear suspensions 12, 14 are interchangeable with stiffer and/or more flexible front and rear suspensions 12, 14, a new youth recreational vehicle 2 does not have to be purchased as the youth grows. As such, the youth recreational vehicle 2 eliminates the need for multiple youth recreational vehicles 2 supporting different youth age groups.

Youth recreational vehicle 2 further includes a seat assembly 16, illustratively a saddle or straddle type seat 17. While seat assembly 16 as shown in FIG. 1 is for a single rider or operator, it is contemplated that youth recreational vehicle 2 may be modified to incorporate two riders as described in U.S. Pat. Nos. 8,678,464 or 8,430,442, the disclosures of which are incorporated herein by reference.

Update as You Grow

In certain aspects, the seat 17 is adjustable forward and backward along a horizontal axis 23 to accommodate different size riders. In certain examples, the seat 17 is translatable forward and backward along a track running parallel to the horizontal axis 23 by six inches, seven inches, eight inches, nine inches, ten inches, eleven inches, twelve inches, or more inches. Additionally, or alternatively, the seat 17 can be adjustable along a vertical axis 25 to accommodate different size riders. In certain examples, the seat 17 is translatable upward and downward along the vertical axis 25 by six inches, seven inches, eight inches, nine inches, ten inches, eleven inches, twelve inches, or more inches. Additionally, or alternatively, the seat 17 can be adjustable along a diagonal axis 27 to accommodate different size riders. In certain aspects, an angle 29 between the diagonal axis 27 and the horizontal axis 23 is greater than 0 degrees and less than 90 degrees (i.e., orthogonal). In certain examples, the seat 17 is translatable along the diagonal axis 27 by six inches, seven inches, eight inches, nine inches, ten inches, eleven inches, twelve inches, or more inches. Due to the seat 17 being adjustable along a horizontal axis 23, a vertical axis 25, and/or a diagonal axis 27, a new youth recreational vehicle 2 does not have to be purchased as the youth grows.

Youth recreational vehicle 2 also includes a steering assembly 18 for steering at least front ground-engaging members 8. Steering assembly 18 could be similar to that described in U.S. Pat. No. 8,122,993, titled POWER STEERING FOR AN ALL TERRAIN VEHICLE, filed Aug. 14, 2008. In the illustrative embodiment shown, steering assembly 18 includes handlebars 19, illustratively left handlebar 19a and right handlebar 19b. Handlebars 19 can include at least one operator input for controlling one or more features or characteristics of youth recreational vehicle 2 such as, for example, the throttle 21. The throttle 21 can be a mechanical throttle or an electronic throttle. In embodiments where the throttle 21 is electronic, the throttle 21 can be speed and/or location controlled, as explained in more detail below.

In certain aspects, the steering assembly 18 is adjustable forward and backward along a horizontal axis 23 to accommodate different size riders. In examples, the steering assembly 18 is translatable forward and backward along the horizontal axis 23 by six inches, seven inches, eight inches, nine inches, ten inches, eleven inches, twelve inches, or more inches. Additionally, or alternatively, the steering assembly 18 can be adjustable along a vertical axis 25 to accommodate different size riders. In certain examples, the steering assembly 18 is translatable upward and downward along the vertical axis 25 by six inches, seven inches, eight inches, nine inches, ten inches, eleven inches, twelve inches, or more inches. Additionally, or alternatively, the steering assembly 18 can be adjustable along a diagonal axis 27 to accommodate different size riders. In certain examples, the steering assembly 18 is translatable along the diagonal axis 27 by six inches, seven inches, eight inches, nine inches, ten inches, eleven inches, twelve inches, or more inches. Due to the steering assembly 18 being adjustable along a horizontal axis 23, a vertical axis 25, and/or a diagonal axis 27, a new youth recreational vehicle 2 does not have to be purchased as the youth grows.

Youth recreational vehicle 2 includes an outer body 20, generally formed of a plastic, carbon fiber, or other material. Outer body 20 may include at least one footwell 22 located on each side of the youth recreational vehicle 2 for placement of a rider's foot while riding. Additionally, or alternatively, the youth recreational vehicle 2 may include foot pegs 31 extending laterally from the youth recreational vehicle 2 for placement of a rider's foot while riding. In certain instances, the foot pegs 31 are detachable and/or foldable into the outer body 20.

Similar to above, in certain aspects, the foot pegs 31 are adjustable forward and backward along a horizontal axis 23 to accommodate different size riders. In examples, the foot pegs 31 are translatable forward and backward along the horizontal axis 23 by six inches, seven inches, eight inches, nine inches, ten inches, eleven inches, twelve inches, or more inches. Additionally, or alternatively, the foot pegs 31 can be adjustable along a vertical axis 25 to accommodate different size riders. In certain examples, the foot pegs 31 are translatable upward and downward along the vertical axis 25 by six inches, seven inches, eight inches, nine inches, ten inches, eleven inches, twelve inches, or more inches. Additionally, or alternatively, the foot pegs 31 can be adjustable along a diagonal axis 27 to accommodate different size riders. In certain examples, the foot pegs 31 are translatable along the diagonal axis 27 by six inches, seven inches, eight inches, nine inches, ten inches, eleven inches, twelve inches, or more inches. Due to the foot pegs 31 being adjustable along a horizontal axis 23, a vertical axis 25, and/or a diagonal axis 27, a new youth recreational vehicle 2 does not have to be used as the youth grows.

Youth recreational vehicle 2 also includes a forward storage area 24 positioned forward of steering assembly 18 and a rear storage area 26 positioned rearward of seat 17. Rear storage area 26 includes a U-shaped or C-shaped rear cargo rack 28 configured to support cargo. In the embodiment shown, cargo rack 28 surrounds at least a portion of seat 17. It should be appreciated that cargo rack 28 could include integrated tie downs such as those described in U.S. Pat. No. 8,905,435, the entire disclosure of which is incorporated herein by reference. As will be described in more detail herein, forward storage area 24 includes a front cargo rack 32 configured to support cargo. It should be appreciated that front rack 32 may also include a plurality of integrated tie downs. Outer body 20 may further include front body panel 33 including front fascia 34 and front fairing 36, light pod 38, inner panel 40, side panel 42, and fender body panels 44. In various embodiments, front fascia 34 and front fairing 36 of front body panel 33 may be a single integral piece, while in other various embodiments, front fascia 34 and front fairing 36 of front body panel 33 may be multiple pieces.

Regenerative Braking and Tether Braking

In instances, the youth recreational vehicle 2 includes one or more braking levers 35, which, when compressed, activate brake pads coupled to the ground-engaging members 6, 8 to slow the youth recreational vehicle 2. Additionally, or alternatively, the youth recreational vehicle 2 includes regenerative braking such that if a user does not activate the throttle 21, the youth recreational vehicle 2 includes a controller 86 that will initiate the torque direction being reversed, which will cause the youth recreational vehicle 2 to slow while also producing electricity that is transmitted to and stored in the battery pack 9. In some instances, the torque would ramp up to a peak for the given speed, then ramp down as speed drops to allow for a smooth stop without jarring the rider. In some embodiments, the youth recreational vehicle 2 includes a brake switch 35A that monitors when a brake lever 35 is depressed and/or a brake position sensor 35A that monitors a position of a brake lever 35. In these instances, when the brake switch 35A/brake position sensor 35A senses a brake lever 35 is depressed, the level of regeneration may be increased when the user is operating the brake to result in a variable regeneration.

In certain instances, the youth recreational vehicle 2 includes one or more tethers 37. The tether 37 can be coupled to a user (e.g., a user's wrist) and include one or more ends 37a that are attached to the youth recreational vehicle 2, such as the handlebar 19. In these embodiments, if the user takes the user's hand off of the handlebar 19 (e.g., if the user falls off the youth recreational vehicle 2), one or more ends 37a of the tether decouple from the handlebar 19, which can initiate sending a signal to a controller 86, which in turn will initiate the regenerative braking of the youth recreational vehicle 2. The regenerative braking will slow and stop the youth recreational vehicle 2 to prevent the youth recreational vehicle 2 from running into another object, such as the user.

Freewheel Mode

According to certain embodiments, the youth recreational vehicle 2 includes a switch 39, which when switched to a first position is configured to operate the youth recreational vehicle 2 in a freewheel mode. In freewheel mode, the motor 10 is disengaged so the regenerative braking is no longer enabled and/or the motor 10 is physically decoupled from the ground engaging members 6, 8 via a physical connection 7 to reduce the amount of drag torque due to the connection between the ground engaging members 6, 8 and the motor 10. In these instances, the youth recreational vehicle 2 can be pushed and/or towed more easily in the event the youth recreational vehicle 2 has a mechanical problem and/or runs out of battery. Further, a user can switch the youth recreational vehicle 2 back to normal mode by switching the switch 39 to a second position, which will reengage the motor 10 so the regenerative braking is reenabled, and/or physically coupling the ground engaging members 6, 8 and the motor 10 via the physical connection 7. Additionally, or alternatively, a user can turn on and off the freewheel mode 111 via the youth vehicle application 114 (illustrated in FIG. 9) on the user device 88.

In aspects, the youth recreational vehicle 2 includes a global positioning satellite (GPS) signal receiver 41 that is configured to receive GPS signals from various satellites. Based on triangulating the signals received from various satellites, the position of the youth recreational vehicle 2 can be determined by the controller 86. In aspects, the position of the youth recreational vehicle is displayed on a user interface 51 of the youth recreational vehicle 2, 3. According to certain embodiments, the GPS signals can be received by the controller 86 and, based on the location of the youth recreational vehicle 2, the controller 86 is configured to modify the functioning of the youth recreational vehicle 2. For example, based on the location of the youth recreational vehicle 2, the power output by the motor 10 can be decreased to, for example, control the top speed of the youth recreational vehicle 2 and/or increase the longevity of the battery pack 9. Additional details about these embodiments are discussed in more detail below in relation to FIGS. 8-11. Additionally, or alternatively, the GPS receiver 41 can be coupled to a transceiver 43, which is configured to transmit the GPS coordinates of the youth recreational vehicle 2 to a user device 88. Additionally, or alternatively, the transceiver 43 can include a cellular modem, which is configured to transmit coordinates of the youth recreational vehicle 2 to a user device 88. Additionally, or alternatively, the position of the youth recreation vehicle 2 can be determined via one or more vehicle to vehicle connections. Additionally, or alternatively, the position of the youth recreation vehicle 2 can be determined using one or more auxiliary devices such as, for example, a cell phone carried by the user of the youth recreational 2, 3 and/or helmet worn by the user of the youth recreational 2, 3. Additional details regarding examples of auxiliary devices for communicating a location are provided in U.S. Patent Publication Number 2020/0145815, filed Oct. 30, 2019, the entire disclosure of which is incorporated herein by reference in its entirety for all purposes.

Battery Placement in a Youth ATV

Figure 2:
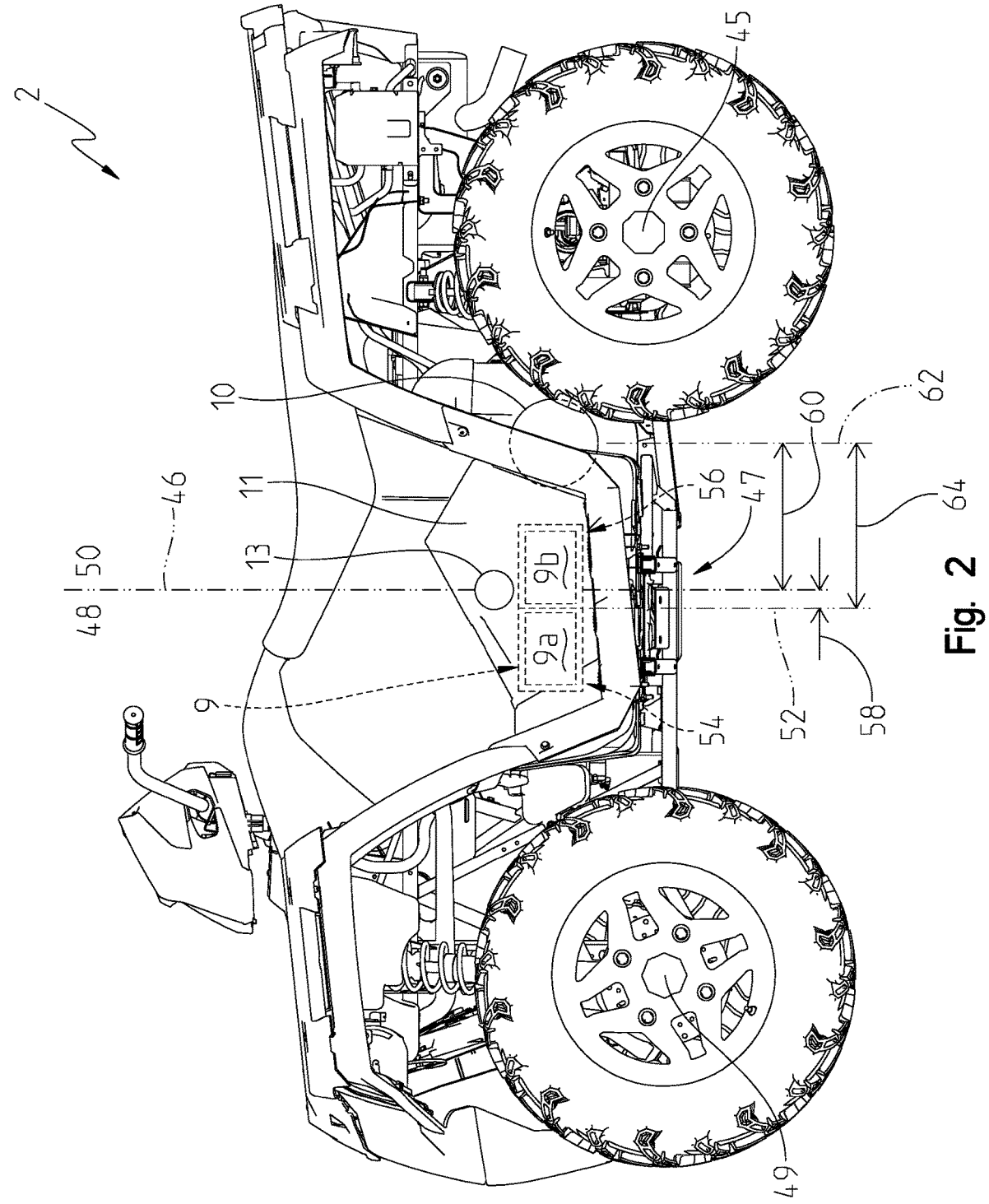
FIG. 2 is a side view of the exemplary youth recreational vehicle illustrated in FIG. 1, in accordance with embodiments of the present disclosure.

FIG. 2 is a side view of the youth recreational vehicle 2 illustrated in FIG. 1, in accordance with embodiments of the present disclosure. However, this diagram is merely an example, which should not unduly limit the scope of the claims. One of ordinary skill in the art would recognize many variations, alternatives, and modifications.

As illustrated, the battery pack 9 may include more than one battery module 9a, 9b. In certain aspects, the placement of the battery pack 9 (e.g., one or both of the battery modules 9a, 9b) and the electric motor 10 are arranged in a manner that maintains weight bias of the youth recreational vehicle 2, reduces the amount of high energy wire routing between the battery pack 9, the electric motor 10 and/or other components of the youth recreational vehicle 2, and/or reduces the distance between the electric motor 10 and the driven component of the youth recreational vehicle 2 (e.g., the rear axle 45).

According to certain embodiments, a vertical vehicle midline 46 delineates the front half 48 of the youth recreational vehicle 2 and the back half 50 of the youth recreational vehicle 2. Further, a vertical battery midline 52 delineates a front half 54 of the battery pack 9 and a back half 56 of the battery pack 9 and a vertical electric motor midline 62 delineates a front half of the electric motor 10 and a back half of the electric motor 10. In aspects, the vertical vehicle midline 46, the vertical battery midline 52, and/or the vertical electric motor midline 62 correspond to the center of mass of the youth recreational vehicle 2, the battery pack 9, and the electric motor 10, respectively.

In certain aspects, the arrangement of the battery pack 9 and the electric motor 10 can be based on one or more of the following: a distance 58 between the vertical battery midline 52 and the vertical vehicle midline 46, a distance 60 between an electric motor midline 62, a distance 64 between the vertical battery midline 52 and the electric motor midline 62, a weight of the battery pack 9, a weight of the electric motor 10, a total weight of the youth recreational vehicle 2 including the battery pack 9 and the electric motor 10, a weight of the youth recreational vehicle 2 and the anticipate weight of a rider, and/or a weight of the youth recreational vehicle 2 without the battery pack 9 and/or the electric motor 10. Accordingly, in certain embodiments, the arrangement of the battery pack 9 and the electric motor 10 are arranged in a manner that results in the center of mass being located at or about the vertical vehicle midline 46.

In some examples, the electric motor 10 may be arranged near the rear axle 45 of the youth recreational vehicle 2; and, to balance the weight of the electric motor 10, the battery pack 9 may be located near the center 47 of the youth recreational vehicle 2. For example, vertical battery midline 52 is aligned with the vertical vehicle midline 46. In these examples, the high energy wire routing between the battery pack 9 and the electric motor 10 can be minimized while still maintaining an adequate weight bias of the youth recreational vehicle 2.

In certain examples, the battery pack 9 is arranged near the front axle 49 of the youth recreational vehicle 2. For example, the vertical battery midline 52 may intersect a portion of the front half 48 of the youth recreational vehicle 2. Alternatively, the electric motor 10 may be located near the center 47 or near the front axle 49 while the battery pack 9 is located near the center 47 or near the rear axle 45. As such, the vertical battery midline 52 may intersect a portion of the back half 50 of the youth recreational vehicle 2 to maintain an adequate weight bias of the youth recreational vehicle 2.

Battery Placement in a Youth SxS

Figure 3:
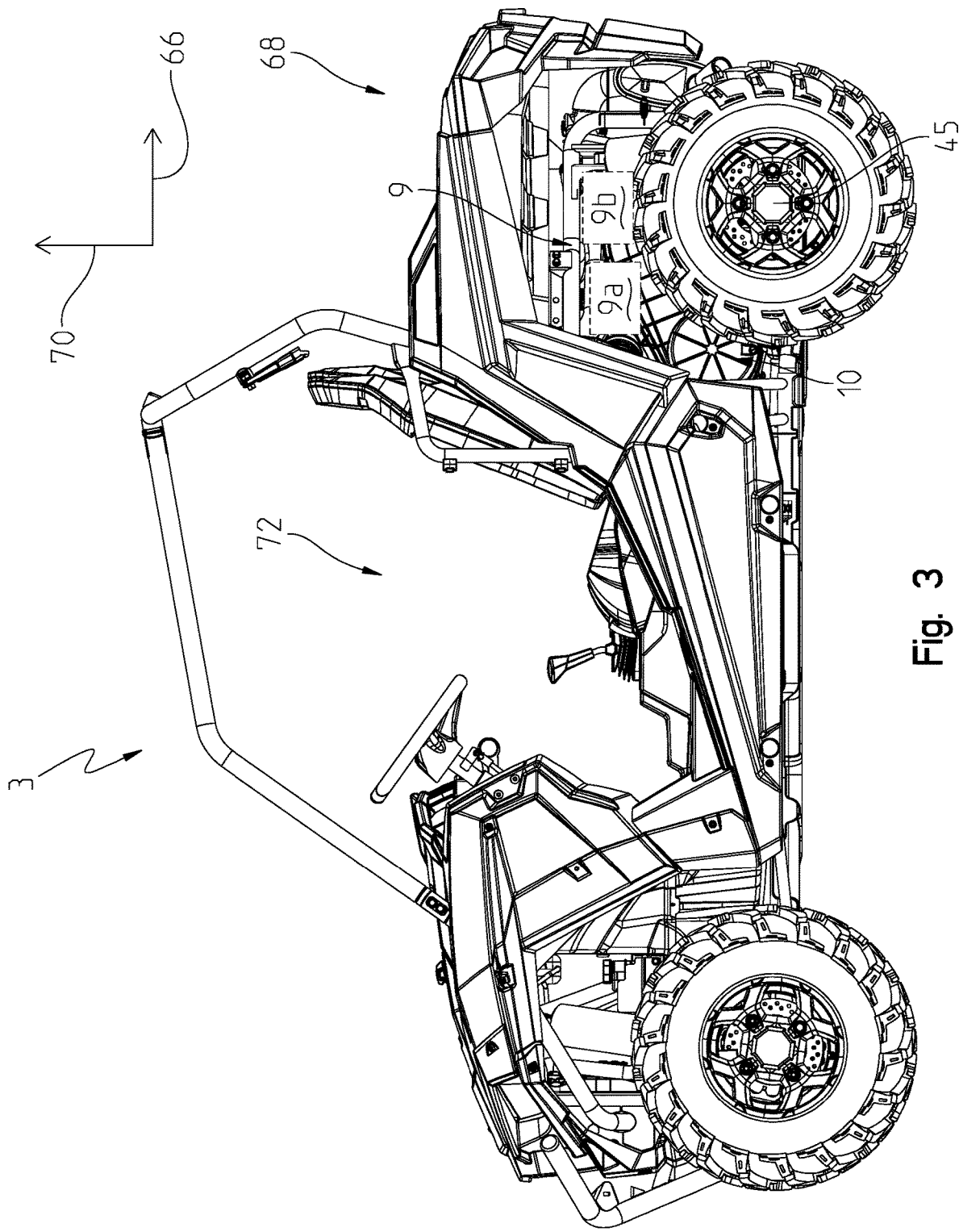
FIG. 3 is a side view of another exemplary youth recreational vehicle, in accordance with embodiments of the present disclosure.

FIG. 3 is a side view of another exemplary youth recreational vehicle 3, in accordance with embodiments of the present disclosure. However, this diagram is merely an example, which should not unduly limit the scope of the claims. One of ordinary skill in the art would recognize many variations, alternatives, and modifications.

In the illustrated embodiment; the youth recreational vehicle 3 is a SxS. As illustrated, the battery pack 9 may include more than one battery module 9a, 9b. In certain aspects, the placement of the battery pack 9 and the electric motor 10 are arranged in a manner that maintains weight bias of the youth recreational vehicle 3, reduces the amount of high energy wire routing between the battery pack 9, the electric motor 10, and/or other components of the youth recreational vehicle 3, and/or reduces the distance between the electric motor 10 and the driven component of the youth recreational vehicle 3 (e.g., the rear axle 45).

In certain embodiments, the battery pack 9 (e.g., one or both of the battery modules 9a, 9b) is placed rearward (e.g., in a rearward direction 66) relative to the electric motor 10. In certain embodiments, one or more of the battery modules 9a, 9b are arranged proximal to a swing arm assembly (e.g., on top of the swing arm assembly) of the youth recreational vehicle 3, as illustrated. Additionally, or alternatively, the battery pack 9 (e.g., one or both of the batteries 9a, 9b) can be placed above (e.g., in a upward direction 70) relative to the electric motor 10. Due to this positioning of the battery pack 9, the battery pack 9 can be accessible from the rear 68 of the youth recreational vehicle 3. Further, due to this positioning of the battery pack 9, cab space 72 is increased, the amount of high energy wiring between the battery pack 9 and the electric motor 10 is reduced, and/or the electric motor 10 is placed proximal the rear axle 45 to reduce the distance between the electric motor 10 and the driven components (e.g., the rear axle 45).

Battery Arrangement for Electric Vehicle, Scalable Electric Powertrain and Energy Storage Module as Calibration Storage Unit In certain aspects, the battery pack 9 included in the youth recreational vehicle 2, 3 is a scalable battery pack 9. As such, the battery pack 9 can include configurable battery modules 9a, 9b. For example, battery modules 9a, 9b can be added, removed, configured to run in series, and/or configured to run in parallel to produce different voltages and/or currents, as explained in more detail below.

According to certain examples, the youth recreational vehicle 2, 3 can be used with one or both of the battery modules 9a, 9b. In instances where the youth recreational vehicle 2, 3 is used with one of the battery modules 9a, 9b, the second of the battery modules 9a, 9b can be charged while the first battery module 9a, 9b is used to run the recreational vehicles 2, 3. In instances, the energy consumption of the youth recreational vehicle 2, 3 can be configured (e.g., by the controller 86) so that the charge time of the battery modules 9a, 9b is approximately the same time as or nominally shorter (e.g., 10 minutes, 15 minutes, 30 minutes) than the run time of the youth recreational vehicles 2, 3 using only one of the battery modules 9a, 9b. As such, the youth recreational vehicles 2, 3 can be configured to continuously run or nearly continuously run using one of the battery modules 9a, 9b, which, when empty, can be switched out for the charged battery module 9a, 9b, allowing 100% run time of the youth recreational vehicles 2, 3.

Figure 4:
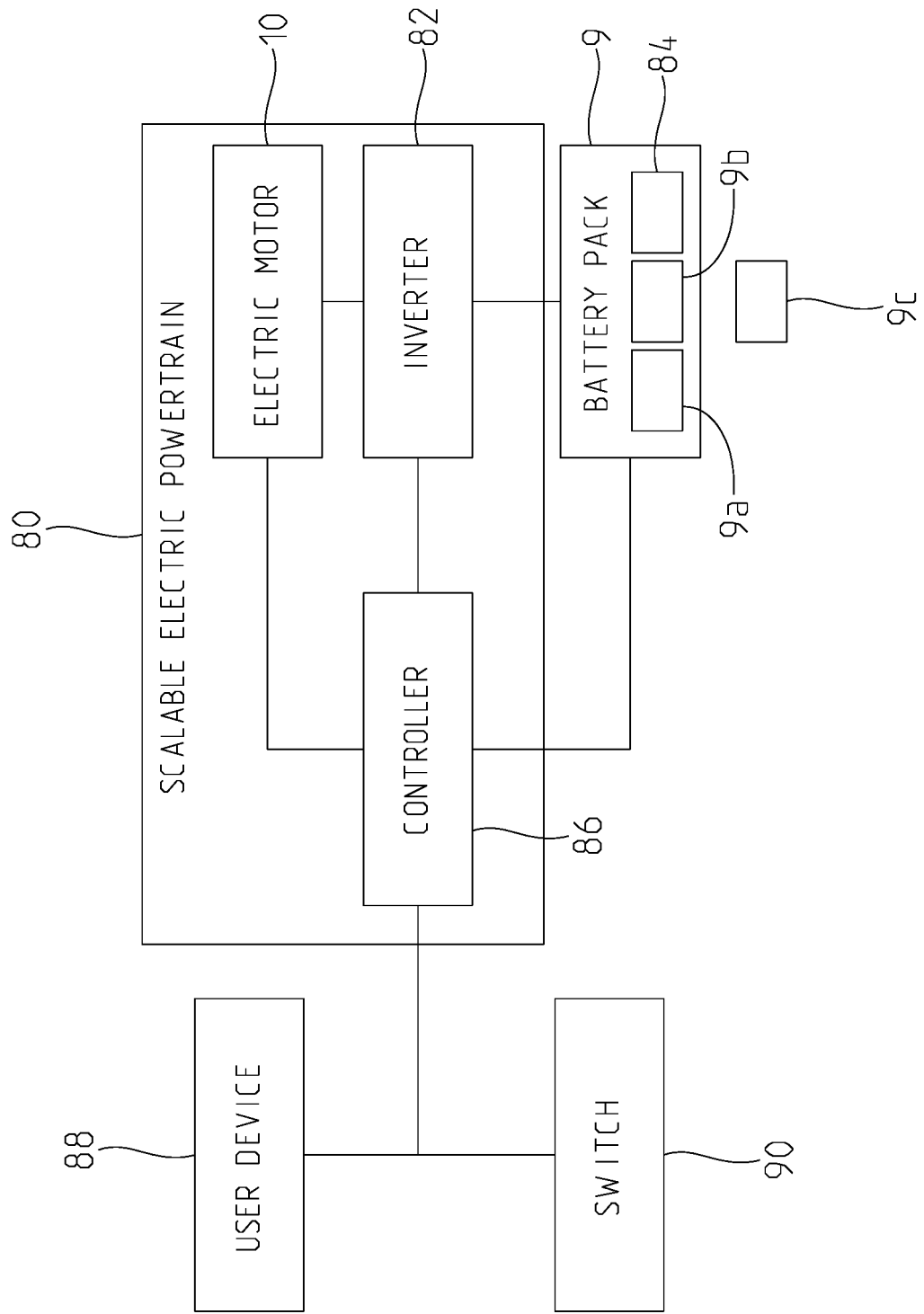
FIG. 4 is a block diagram of an exemplary scalable electric powertrain, in accordance with embodiments of the present disclosure.

According to certain embodiments, the youth recreational vehicle 2, 3 includes a scalable electric powertrain 80, as illustrated in FIG. 4. FIG. 4 is merely an example, which should not unduly limit the scope of the claims. One of ordinary skill in the art would recognize many variations, alternatives, and modifications.

In aspects, the electric powertrain 80 includes an electric motor 10, an inverter 82, a battery pack 9 including one or more battery modules 9a, 9b, and a controller 82. The inverter 82 receives current from the battery pack 9 and converts the direct current (DC) from the battery pack 9 to alternating current (AC), which is used to power the electric motor 10.

In certain aspects, the electric motor 10 and the inverter 82 are designed to work with different battery module 9a, 9b, 9c configurations. For example, the battery pack 9 includes a receptacle 84 for receiving additional battery modules (e.g., battery module 9c). In aspects, the battery module 9c can be added to the battery modules 9a, 9b to increase the voltage or the current supplied to the motor 10. For example, battery module 9c can be added in series with the battery module 9a, 9b to increase the voltage supplied by the battery pack 9. As another example, battery module 9c can be added in parallel with the battery modules 9a, 9b to increase the current supplied by the battery pack 9. By increasing the voltage and/or the current of the battery pack 9, the power of the youth recreational vehicle 2, 3 can be increased.

As another example, one of the battery modules 9a, 9b can be removed from the battery pack 9 to decrease the voltage or current supplied to the motor 10. By being able to increase or decrease the power supplied by the battery pack 9, the youth recreational vehicle 2, 3 can be adapted to different size riders (e.g., younger and older siblings) and adapted to suit the preferences of a youth as the youth grows.

Additionally, or alternatively, the controller 86 can configure the scalable electric powertrain 80 to increase the max power output of the electric motor 10 or decrease the max power output of the electric motor 10. As such, the scalable electric powertrain 80 can be configured to reduce the max power output of the electric motor 10 for a smaller and/or younger youth or when the battery pack 9 is running low on charge and increase the max power output of the electric motor 10 for a larger and/or older youth or when the battery pack 9 has sufficient charge. In certain examples, a user can configure the power output of the electric motor 10 using a user device 88.

In certain embodiments, the battery modules 9a, 9b, 9c are designed to have the same battery characteristics or different battery characteristics. In certain instances, the first battery module 9a has first battery characteristics, the second battery module 9b has second battery characteristics, and the third battery module 9c has third battery characteristics, where the first, second and third battery characteristics are different. For example, one or more of the battery modules 9a, 9b, 9c may be used for high power, short duration use cases, one or more of the battery modules 9a, 9b, 9c may be used medium power, medium duration sue cases, and one or more of the battery modules 9a, 9b, 9c may be used for low power, long duration use cases. In these instances, one or more of the battery modules 9a, 9b, 9c may be interchanged with each other, depending on the use case. Additionally, or alternatively, the controller 86 calibrates the electric powertrain 80 depending on which battery module(s) 9a, 9b, 9c is being used. Example calibrations include, but are not limited to, discharge and charge current configurations.

Additionally, or alternatively, youth recreational vehicle 2, 3 can be equipped with all the battery modules 9a, 9b, 9c and the controller 86 can configure the battery pack 9 and/or the motor 10 to different powertrain configurations based on who is using the youth recreational vehicle 2, 3 and/or the location of the youth recreational vehicle 2, 3. For example, the controller 86 can configure the powertrain 80 to: (i) output a high peak power that the battery pack 9 is capable of producing for a short duration, (ii) a medium peak power that the battery pack 9 is capable of producing for a medium duration, or (iii) a low peak power that the battery pack 9 is capable of producing for a long duration. In some examples, the controller 82 can configure the battery pack 9 and/or motor 10 to output a peak power in a range of between 1,000 watts to 7,000 watts. Specific examples include, but are not limited to, the controller 82 configuring the battery pack 9 and/or motor 10 to output a peak power of 1,000 watts, 1,500 watts, 2,500 watts, 3,500 watts, 4,500 watts, 5,500 watts, 6,500 watts, 7,000 watts, etc. Additionally, or alternatively, the battery modules 9a, 9b, 9c can have different battery capacities including a range of battery capacities from, for example, 500 Wh to 3,000 Wh. Specific examples of battery capacities include, but are not limited to, 500 Wh, 750 Wh, 1,000 Wh, 1,250 Wh, 1,500 Wh, 2,000 Wh, 2,500 Wh, 3,000 Wh, and/or the like. Exemplary voltage ranges of the battery modules 9a, 9b, 9c include, but are not limited to 48V-60V. Other characteristics of the battery modules 9a, 9b, 9c that can be variable and/or configurable include, but are not limited to, nominal voltage and/or continuous, peak discharge, and/or charge current limits. However, these are only examples and not meant to be limiting.

Axial Flux Motor

Figure 5:
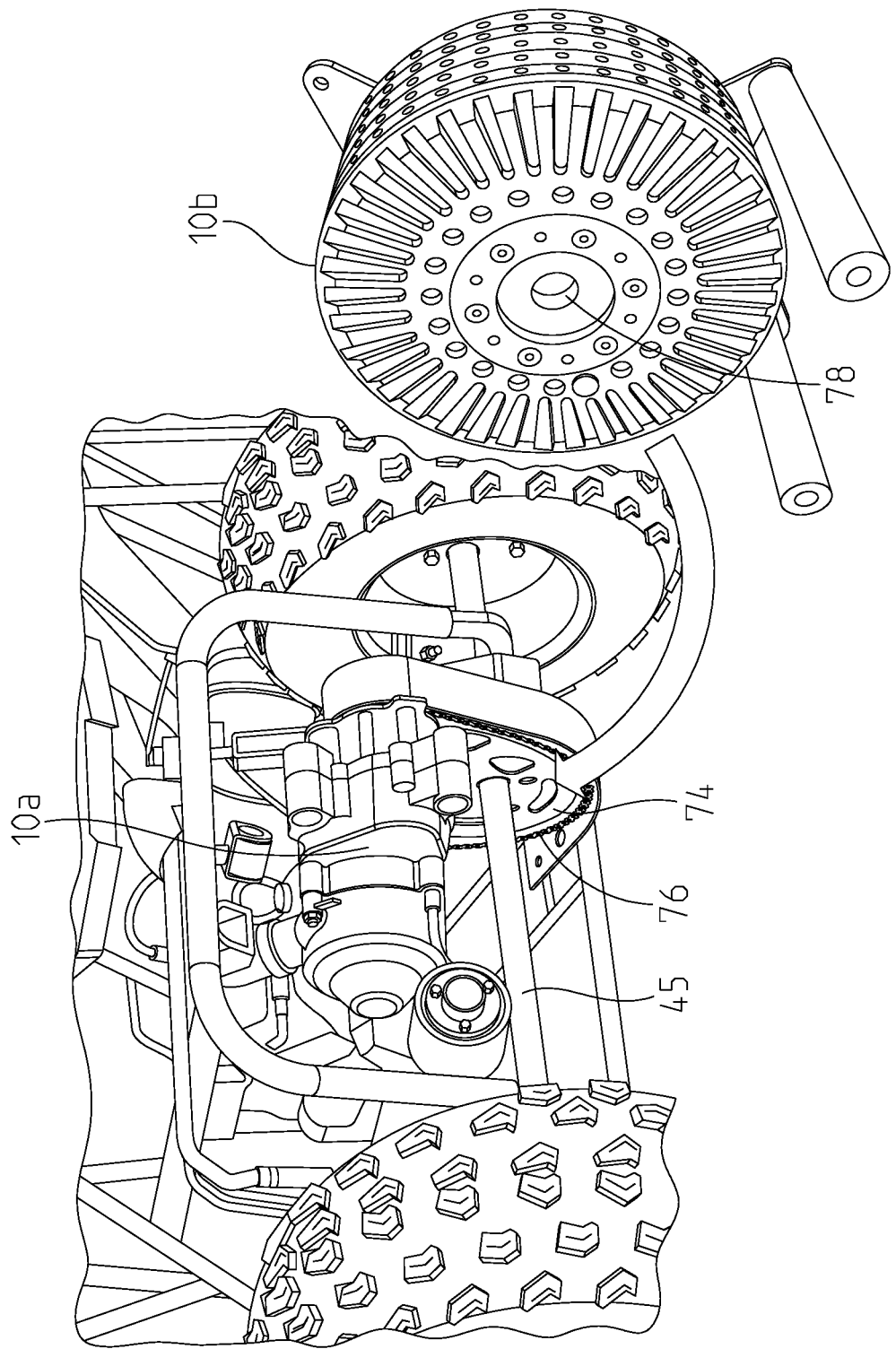
FIG. 5 is a perspective view of an exemplary electric motor, in accordance with embodiments of the present disclosure.

FIG. 5 is a perspective view of an exemplary electric motor 10, in accordance with embodiments of the present disclosure. FIG. 5 is merely an example, which should not unduly limit the scope of the claims. One of ordinary skill in the art would recognize many variations, alternatives, and modifications.

According to certain embodiments, the electric motor 10 is a radial flux motor 10a or an axial flux motor 10b, as illustrated. In certain aspects where the electric motor 10 is a radial flux motor 10a, the radial flux electric motor 10a is coupled to a sprocket 74 via a chain 76 or other coupling mechanism. The electric motor 10a drives rotation of the sprocket 74, which in turn drives the axle 45 to rotate the ground-engaging members 8 of the youth recreational vehicle 2, 3.

Alternatively, in certain aspects, the electric motor 10 is an axial flux motor 10b. The axial flux motor 10b includes a conduit 78 through which the axle 45 is arranged. Axial flux motor 10b then directly drives the axle 45 without the need for the sprocket 74 and/or chain 76. Because the sprocket 74 and/or chain 76 is no longer needed when the electric motor 10 is an axial flux motor 10b, more space is available in the youth recreational vehicle 2, 3 for additional battery modules 9a, 9b, storage, and/or other components. In addition, the removal of the sprocket 74 and/or 76 eliminates the possibility of one or more of the components wearing down and/or breaking.

Combined Youth & Accessory Station

Figure 6:
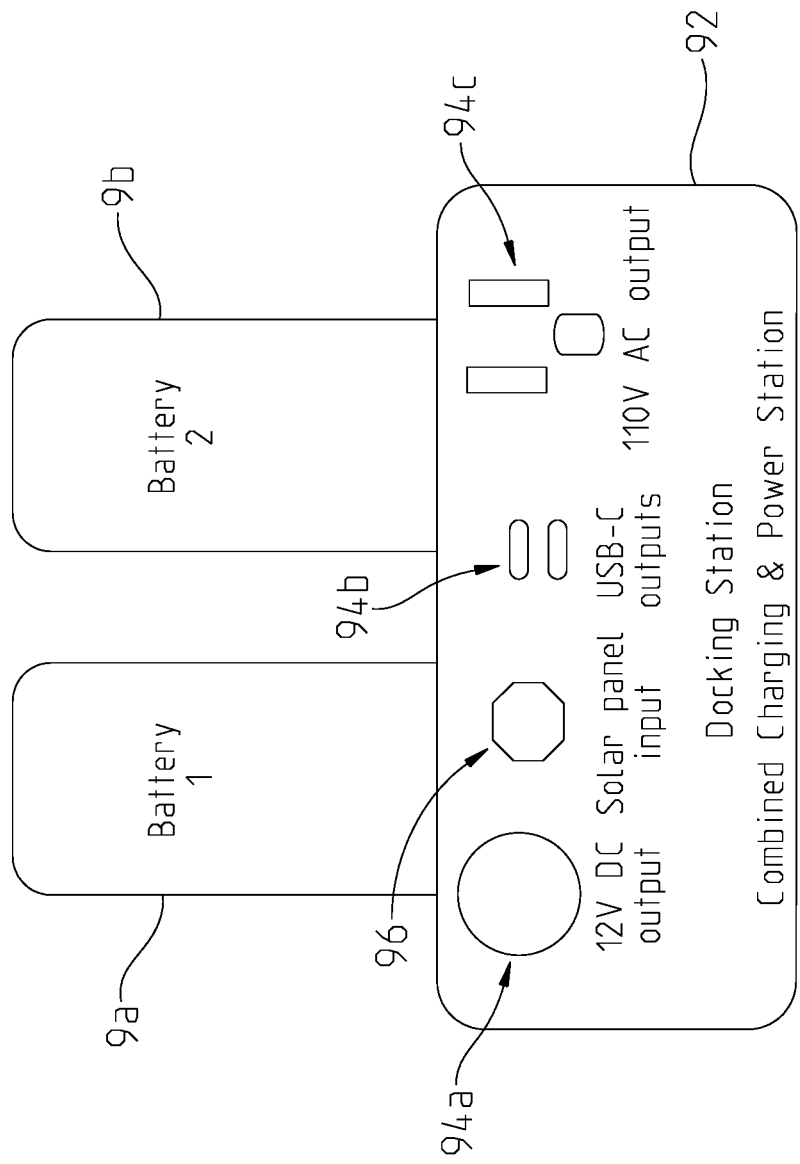
FIG. 6 is an illustration of an exemplary docking station, in accordance with embodiments of the present disclosure.

FIG. 6 is an illustration of an exemplary docking station, in accordance with embodiments of the present disclosure. FIG. 6 is merely an example, which should not unduly limit the scope of the claims. One of ordinary skill in the art would recognize many variations, alternatives, and modifications.

In certain aspects, one or more of the battery modules 9a, 9b can be attached to a docking station 92, as illustrated. In certain instances, the docking station 92 can receive one or more of the battery modules 9a, 9b. The docking stations 92 can be used with one or both of the battery modules 9a, 9b to provide a wide power and energy range. In certain instances, the docking station 92 includes an intelligent energy management system (EMS) so that two battery modules 9a, 9b with different states of charge (SoC) can be operated at the same time.

While plugged into the docking station 92, the battery modules 9a, 9b can be used to provide power to one or more other accessory devices. For example, the docking station 92 can include one or more receptacles 94 configured to receive one or more electrical input cords from various accessory devices. Exemplary receptacles 94 include, but are not limited to, a 12 volt (V) DC receptacle 94a, a universal serial bus (USB) receptacle 94b, and/or a 110 V AC receptacle 94c. Exemplary accessory devices include, but are not limited to, light-emitting diode (LED) light bars, laptops, devices that charge using a USB cord (e.g., a mobile device), power tools, welders, compressors, refrigerators, and/or the like. In aspects, the docking station 92 includes circuitry to convert the power output by the battery modules 9a, 9b to the appropriate voltage and current for each respective receptacle 94.

The table below illustrates the use time of different accessory devices for a battery module 9a, 9b having a rated power of 1,500 W, a peak power of 3,500 W, and a storage capacity of 1,500 Wh.

| Accessory | Voltage | Current | Power | Use | Comment |
|---|---|---|---|---|---|
| 32" LED Light Bar | 12 V DC | 15 Amp draw | 180 W | >8 h | 32" LED Light bar could be used more than 8 hours |
| 6" LED Light Bar | 12 V DC | 10 Amp draw | 120 W | >12 h | and 6" LED Light bar for more than 12 hours with one Youth Battery. |
| Winch 6.6 hp | 12 V DC | 380 Amp draw loaded | 4,560 W | >30 min w/ 2 batteries | Requires two Youth Batteries in parallel to meet Peak Power requirements. |
| Refrigerator | 12 V DC | 0.7-2.3 Amp draw | 27.6 W | >50 h | Refrigerator can be used for more than 50 hours with one Youth Battery. |
| LED work light | 12 V DC | 2.4 Amp draw per light | 28.8 W | >50 h | LED work light can be used for more than 50 hours with one Youth battery |
| Rock lights | 12 V DC | 2 Amp draw per kit | 24 W | >60 h | Rock lights can be used for more than 60 hours with one Youth Battery. |
| Onboard Compressor | 12 V DC | 50 Amp draw loaded | 600 W | >2 h | Onboard compressor could be used for more than 2 hours with one Youth Battery. |
| USB Port | 5 V DC | 2.1-4.8 Amp | 24 W | >60 h | USB ports can be used for more than 60 hours with one Youth Battery. |
| 110 AC port 200 watts | 12 V DC to 115 AC | 16 Amps max | 200 W | >7 h | 110 AC port with 200 W could be used for more than 7 hours with one Youth Battery. |
| Remote switch panel | 12 V DC | 0-200 Amp service | 2,400 W | >30 minutes | Remote switch panel could be used for more than >30 minutes at peak power with one Youth Battery. |
| Onboard welder | 12 V DC | 160 Amp max | 1,920 W | >45 minutes | Onboard welder could be used for more than >45 minutes with one Youth Battery. |

Additionally, or alternatively, the docking station 92 can be used to charge the battery modules 9a, 9b. For example, the docking station 92 includes a receptacle 96 configured to receive a first end of a power cord that will provide power to the docking station 92 and charge the battery modules 9a, 9b. In certain aspects, a second end of the power cord can be plugged into an outlet (e.g., 110 V AC outlet), a 12 V DC output, and/or the like.

In certain aspects, the docking station 92 is integrated into a youth recreational vehicle 2, 3, as illustrated in FIG. 1. In certain aspects, the docking station 92 is releasably coupled to the youth recreational vehicle 2 so the docking station 92 can be decoupled and removed from the youth recreational vehicle 2 and made portable. According to certain aspects, the youth recreational vehicle 2, 3 can include circuitry that while the docking station 92 is coupled to the youth recreational vehicle 2, 3, the battery modules 9a, 9b provide power to the receptacles 94.

Energy Recover Suspension

Figure 7:
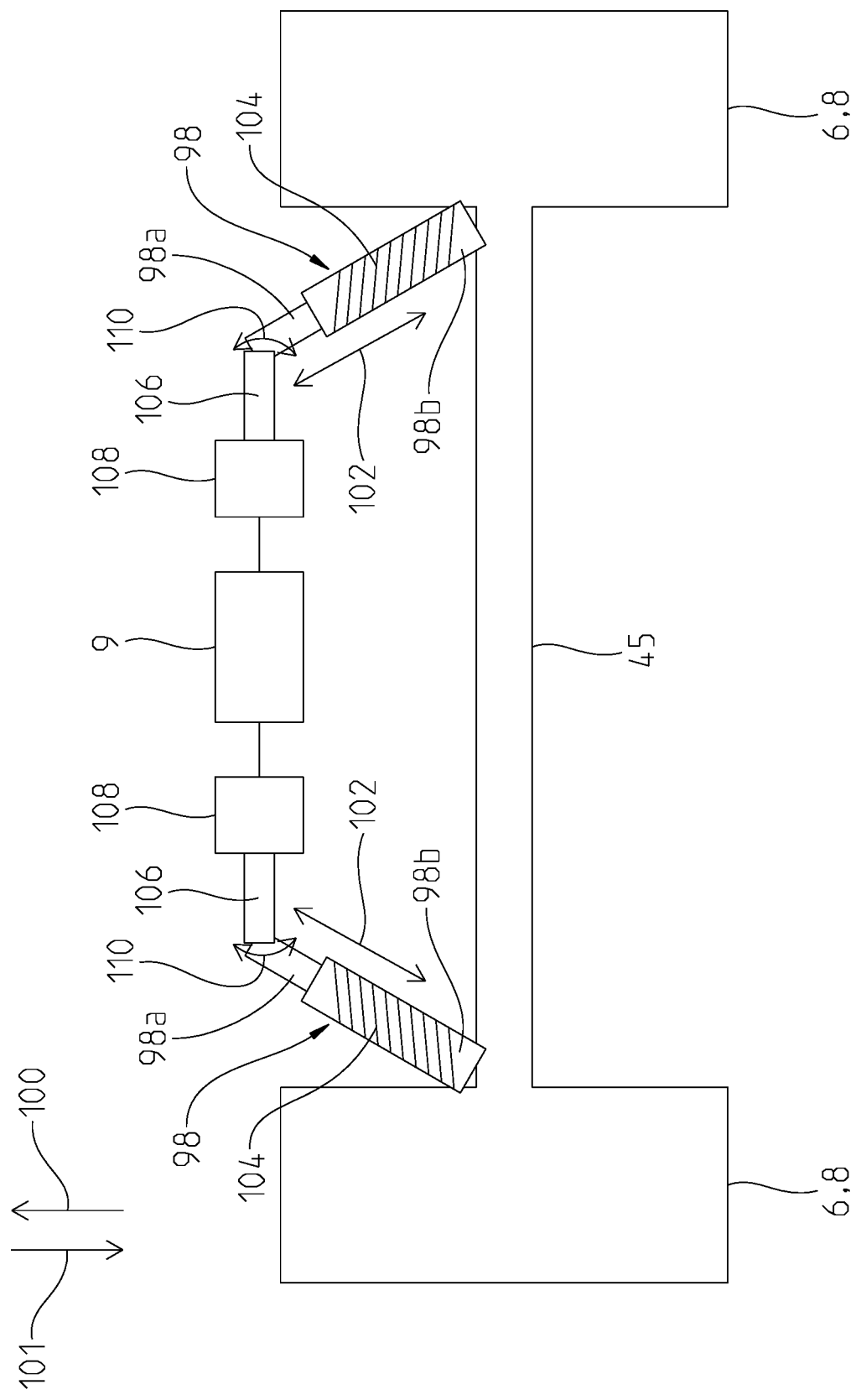
FIG. 7 is a diagram of an exemplary regenerative suspension system, in accordance with embodiments of the present disclosure.

FIG. 7 illustrates a diagram of a regenerative suspension system 98 for a youth recreational vehicle 2, in accordance with embodiments of the present disclosure. FIG. 7 is merely an example, which should not unduly limit the scope of the claims. One of ordinary skill in the art would recognize many variations, alternatives, and modifications.

According to certain embodiments, the suspension 98 can be incorporated into the front suspension 12 and/or the rear suspension 14 of the youth recreational vehicles 2, 3. In aspects, suspension 98 provides energy to the battery pack 9 via the compression and extension of the suspension 98. For example, the upper portion 98a can be formed and/or include a magnetic material and the lower portion 98b can include one or more electrical wires 104. Further, in certain embodiments, the suspension 98 can include an upper portion 98a that extends into a lower portion 98b. When the ground engaging members 6, 8 move in an upward direction 100 or a downward direction 101, the suspension 98 compresses and the upper portion 98a extends into the lower portion 98b along the direction 102. In response, the magnetic material of the upper portion 98a passes inside of the electrical wires 104 of the lower portion 98b when the suspension 98 is compressed, and an electromotive force is produced that is transferred to battery pack 9 to charge the battery pack 9.

As another example, each suspension 98 can be coupled to an arm 106. Further, each arm 106 can be coupled to an alternator 108. In response to the ground engaging members 6, 8 moving in an upward direction 100 or a downward direction 101, the suspension 98 moves the arms 106 upwards and downwards along the direction 110. The mechanical motion can then be transformed into electrical energy by the alternator 108. The electrical energy produced by the alternator 108 can be transferred to the battery pack 9 to charge the battery pack 9.

As even another example, each suspension 98 can include a pump that translates a fluid along the direction 102 in response to the ground engaging members 6, 8 moving in an upward direction 100 or a downward direction 101. The translated fluid from the suspension 98 can then cause the arm 106 to move along the direction 110. In response to the movement of the arms 106, the alternator 108 can generate electrical energy which is used to charge the battery pack 9.

Due to the youth recreational vehicle 2, 3 oftentimes being ridden in off-road environments, the amount of energy produced by the suspension 98 can be 0.25 kWh per mile travelled or greater than a suspension incorporated into a non-recreational vehicle being ridden on the road. As such, the suspension 98 offers advantages over a similar suspension that would be incorporated into a non-recreational vehicle.

Figure 8:
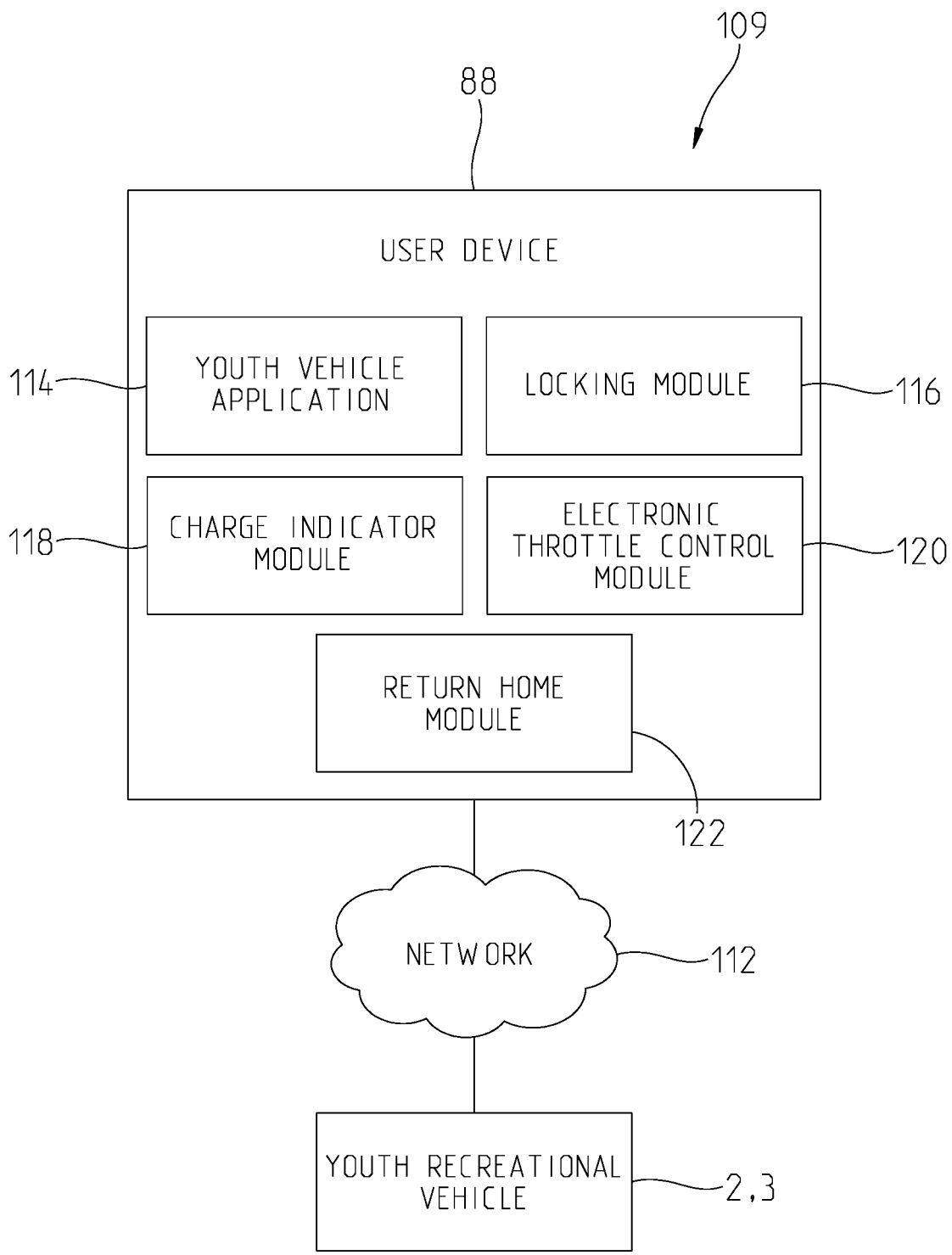
FIG. 8 is a block diagram of a system for controlling a youth recreational vehicle, in accordance with embodiments of the present disclosure.

FIG. 8 is a block diagram of a system 109 for controlling a youth recreational vehicle, in accordance with embodiments of the present disclosure. FIG. 8 is merely an example, which should not unduly limit the scope of the claims. One of ordinary skill in the art would recognize many variations, alternatives, and modifications.

As illustrated, the system 109 includes a user device 88 communicatively coupled to a youth recreational vehicle 2, 3 via a network 112. It will be appreciated that while system 109 is illustrated as comprising one user device 88, any number of such elements may be used in other examples. Further, the functionality described herein with respect to the user device 88 may be distributed among or otherwise implemented on any number of different computing devices in any of a variety of other configurations in other examples.

The user device 88 may each be any of a variety of computing devices, including, but not limited to, a mobile computing device, a laptop computing device, a tablet computing device, or a desktop computing device. The network 112 can be a local area network, a wireless network, or the Internet, or any combination thereof, among other examples.

In aspects, the user device 88 is able to control various aspects of the youth recreational vehicle 2, 3, as described below. To do so, in certain instances, the youth recreational vehicle 2, 3 includes a youth vehicle application 114, a locking module 116, a charge indicator module 118, an electronic throttle control module 120, and/or a return home module 122.

According to certain embodiments, the youth recreational vehicle application 114 allows a user to view various operating parameters of the youth recreational vehicle 2, 3, such as the location of the youth recreational vehicle 2, 3, the charge level of the battery pack 9 of the youth recreational vehicle 2, 3, whether the youth recreational vehicle 2, 3 is experiencing any mechanical issues, and/or whether the lock 13 for the access panel is 11 is locked or unlocked. In examples, the youth recreational vehicle 2, 3 can be a website or an application installed on the user device 88.

Figure 9:
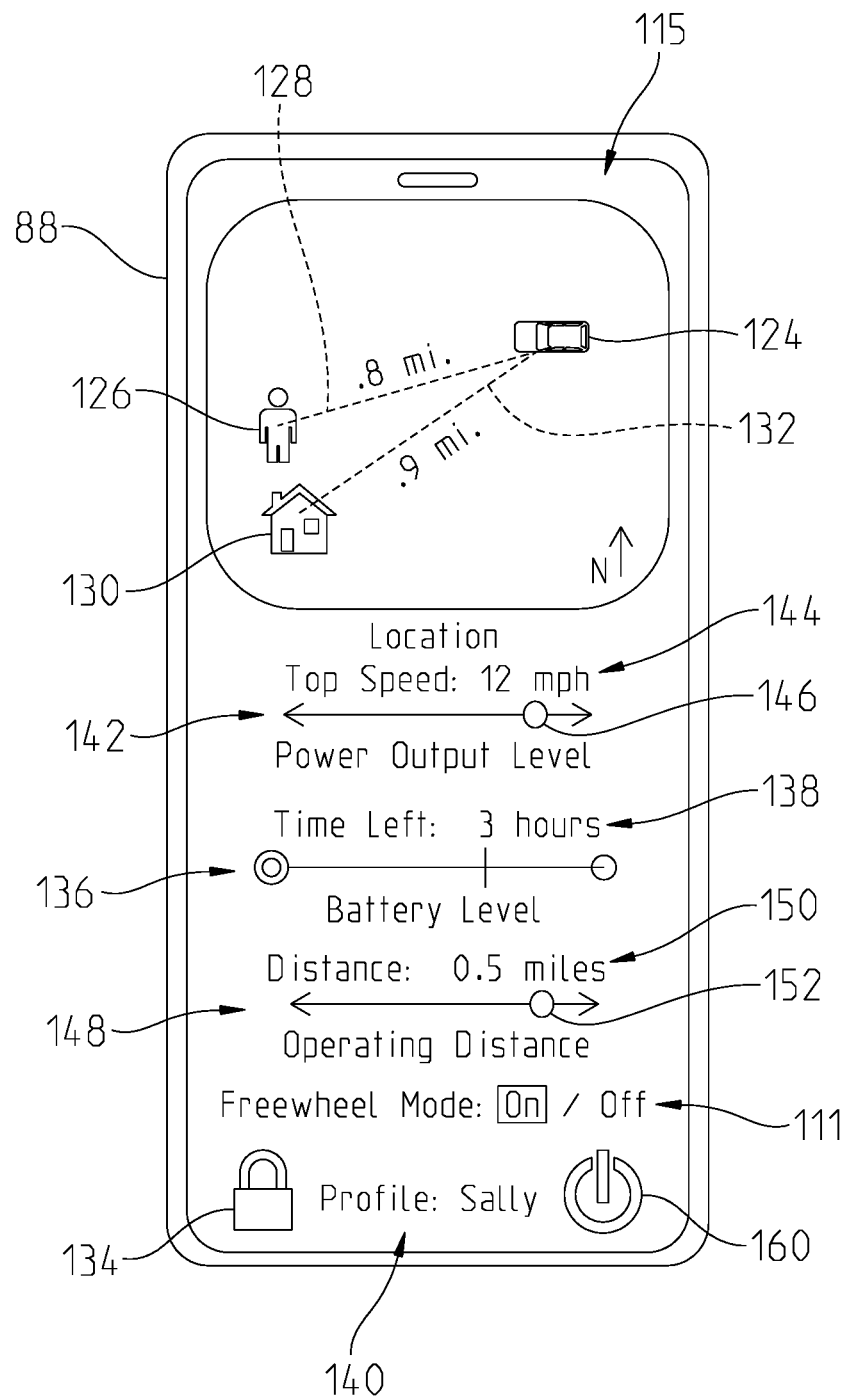
FIG. 9 is an illustration of a user interface of a youth recreational vehicle application, in accordance with embodiments of the present disclosure.

Referring to FIG. 9, an example of a user interface 115 of the youth recreational vehicle application 114 is illustrated. In aspects, the user device 88 may send to and receive signals from the youth recreational vehicle 2, 3. Included in those signals may correspond to the location 124 of the youth recreational vehicle 2, 3 determined by the GPS receiver 41 and transmitted by the transceiver 43 to the user device 88. In certain embodiments, the youth vehicle application 114 can show the location of the youth recreational vehicle 2, 3 relative to the location of the user 126 (e.g., a parent or another supervising person). In some examples, a distance 128 between the location 124 of the youth recreational vehicle 2, 3 and a location of the user 126 can be shown in on the user interface 115. Additionally, or alternatively, the youth vehicle application 114 can show the location of the youth recreational vehicle 2, 3 relative to the location of a residence or start point 130. In some examples, a distance 132 between the location 124 of the youth recreational vehicle 2, 3 and a location 130 of a residence or start point can be shown in on the user interface 115. Due to these capabilities, a parent or another supervising person can better supervise a youth using the youth recreational vehicle 124.

Referring back to FIG. 8, the locking module 116 allows a user, via the user interface 115 of the user device 88, to lock or unlock access panel 11, according to certain embodiments. For example, the user interface 115 shown in FIG. 9 can include a lock symbol 134 indicating whether the access panel 11 is locked or unlocked. That is, for example, when the lock symbol 134 is shown as being locked as illustrated in FIG. 9, the access panel 11 is locked. Conversely, when the lock symbol 134 is shown as being unlocked, the access panel 11 is unlocked. In certain embodiments, the user can touch the lock symbol 134 to lock or unlock the access panel 11. For example, in response to a user touching the lock symbol 134, the user device 88 sends a signal to the transceiver 43 to unlock the access panel 11. The transceiver 43 then relays the signal to the controller 86, which can send a signal to the lock 13 to unlock. In certain aspects, the controller 86 sends a confirmation signal to the transceiver 43 to confirm the lock 13 has been unlocked. The transceiver 43 can relay the confirmation signal to the user device 88 as confirmation the lock 13 has been unlocked. Conversely, if the lock 13 is unlocked, a user can touch the symbol 134 to lock the lock 13. The transceiver 43 then relays the signal to the controller 86, which can send a signal to the lock 13 to lock. In certain aspects, the controller 86 sends a confirmation signal to the transceiver 43 to confirm the lock 13 has been locked. The transceiver 43 can relay the confirmation signal to the user device 88 as confirmation the lock 13 has been locked. Because the battery pack 9 can include configurable battery modules 9a, 9b, 9c, being able to lock the access panel 11 reduces the likelihood of unauthorized tampering and/or theft of the battery pack 9, which can be a particularly expensive component of the youth recreational vehicle 2, 3.

Charge Level Indicator and Electronic Throttle Control

In aspects, the charge indicator module 118 allows a user via the user interface 115 of the user device 88 to view the current charge level of the youth recreational vehicle 2, 3. For example, the user interface 115 can include a battery level indicator 136 indicating the remaining time 138 the youth recreational vehicle 2, 3 can be operated prior to the battery pack 9 exhausting its charge. In certain instances, the time remaining 138 indicates how much time is left if the youth recreational vehicle 2, 3 is operated at max power output. Alternatively, the time remaining 138 indicates how much time is left if the youth recreational vehicle 2, 3 is operated at its average power output for the current user session of the youth recreational vehicle 2, 3. Alternatively, the time remaining 138 indicates how much time is left if the youth recreational vehicle 2, 3 is operated at its average power output for the all user sessions of the youth recreational vehicle 2, 3. Alternatively, the time remaining 138 indicates how much time is left if the youth recreational vehicle 2, 3 is operated at its average power output corresponding to the user profile 140 of the youth recreational vehicle 2, 3.

In certain embodiments, the charge indicator module 118 provides updates as to the time remaining 138. For example, the charge indicator module 118 can prompt a user as to whether to provide notifications when different thresholds of time remaining 138 are met. In certain examples, a user is able to configure a notification to be provided when the time remaining 138 is X hours or minutes. In response, the user device 88 can periodically ping the youth recreational vehicle 2, 3, via the transceiver 43, to request a charge level of the battery pack 9. In response, the controller 86 checks the charge level of the battery pack 9, sends a charge level signal to the transceiver 43, which the transceiver 43 relays to the user device 88 for display on the user interface 115. Additionally, or alternatively, the controller 86 can periodically check the charge level of the battery pack 9, send a charge level signal to the transceiver 43, which is relayed to the user device 88 for display on the user interface 115, without the user device 88 pinging the youth recreational vehicle 2, 3 for the charge level of the battery pack 9. By being able to monitor the time remaining 138 for the battery pack 9 and receive notifications based on the same, a parent or another supervising person can reduce the likelihood a youth operating the youth recreational vehicle 2, 3 unintentionally exhausts the charge of the battery pack 9, perhaps a long distance away from where the youth intends to stop using the youth recreational vehicle 2, 3 (e.g., the youth's home).

Additionally, or alternatively, the youth recreational vehicle 2, 3, can include a charge indicator level. In some embodiments, the charge indicator level can be included in a display of the youth recreational vehicle 2, 3. Additionally, or alternatively, the charge indicator level can be incorporated into an aesthetic feature of the youth recreational vehicle 2, 3, such as the grill of the youth recreational vehicle 2, 3, a logo on the youth recreational vehicle, 2, 3, and/or the like. An example of a logo indicating different levels of charge of the battery pack 9 is illustrated in FIG. 16. In the illustrated example of FIG. 16, the illumination of the logo corresponds to the charge level of the battery pack 9. For example, when the logo is completely illuminated when the charge is at approximately 100%, when the logo is about half illuminated when the charge is at approximately 50%, etc. In embodiments, other indicia can indicate a charge level of the battery pack 9. For example, when the charge level of the battery pack 9 is below a certain level, the headlights of the youth recreational vehicle 2, 3 can flash, the youth recreational vehicle 2, 3 can display other visual signals, auditory signals, haptic signals, and/or the like.

Additionally, or alternatively, the youth recreational vehicle 2, 3 can sense when the youth recreational vehicle 2, 3 is no longer moving. In at least some of these embodiments, when the youth recreational vehicle 2, 3 has not been moving for a threshold amount of time, the youth recreational vehicle 2, 3 can send a notification to the user device 88 via, for example, the transceiver 43, indicating the youth recreational vehicle 2, 3 has not been moving for the threshold amount of time. In some instances, the youth recreational vehicle 2, 3 can include a speaker so that the person using the user device 88 can communicate with the rider of the youth recreational vehicle 2, 3 to determine whether the rider is okay. In some embodiments, the youth recreational vehicle 2, 3 can include a microphone, touchpad, or other device for which the rider can use to respond to the communication asking whether the rider is okay.

Electronic Throttle Control

According to certain embodiments, the electronic throttle controller module 120 allows a parent or another supervising parent to configure the max power output by the youth recreational vehicle 2, 3. For example, the user interface 115 can include a power output level indicator 142 indicating the maximum power output 144 of the youth recreational vehicle 2, 3. In certain instances, the maximum power output 144 is designated by a top speed of the youth recreational vehicle 2, 3. According to certain embodiments, a user can increase or decrease the power output level 142. For example, by sliding an indicator 146 to the left, the max power output 144 is decreased and by sliding the indicator 146 to the right, the max power output 144 is increased. That is, in certain embodiments, in response to a user sliding the indicator 146 to the left, the user device 88 sends a signal to the transceiver 43 to reduce the power output level 142 of the youth recreational vehicle 2, 3. The transceiver 43 then relays the signal to the controller 86, which can send a signal to the electric motor 10 and/or battery pack 9 to decrease the max power output 144 of the electric motor 10. In certain aspects, the controller 86 sends a confirmation signal to the transceiver 43 to confirm the max power output 144 has been decreased. The transceiver 43 can relay the confirmation signal to the user device 88 as confirmation the max power output 144 has been decreased along with the new max power output 144 of the youth recreational vehicle 2, 3. Conversely, in certain embodiments, in response to a user sliding the indicator 146 to the right, the user device 88 sends a signal to the transceiver 43 to increase the power output level 142 of the youth recreational vehicle 2, 3. The transceiver 43 then relays the signal to the controller 86, which can send a signal to the electric motor 10 and/or battery pack 9 to increase the max power output 144 of the electric motor 10. In certain aspects, the controller 86 sends a confirmation signal to the transceiver 43 to confirm the max power output 144 has been increased. The transceiver 43 can relay the confirmation signal to the user device 88 as confirmation the max power output 144 has been increased along with the new max power output 144 of the youth recreational vehicle 2, 3.

In certain embodiments, the electronic throttle control module 120 can receive different profiles 140 for different users. Further, the electronic throttle control module 120 is able to receive and store different max power outputs 144 for different user profiles 140. As such, if a youth is younger and/or less experienced than another user, the max power output 144 can be configured and saved to the youth's profile to be lower than an older and/or more experience youth. This way a parent or other supervising person does not have to remember to reduce the max power output 144 when different youths use the recreational vehicle 2, 3. Instead, a parent or other supervising person can select a youth's profile and any restrictions that go along with the youth's profile (e.g., the max power output 144) can automatically be configured upon selection of the youth's user profile.

According to certain embodiments, the electronic throttle controller module 120 can configure different max power outputs 144 based on how far the youth recreational vehicle 2, 3 is from one or more designated locations. That is, in aspects, the user device 88 can periodically ping the youth recreational vehicle 2, 3, via the transceiver 43, to request a distance of the youth recreational vehicle 2, 3 from a designated location. In response, the controller 86 checks the location of the youth recreational vehicle 2, 3 using the GPS receiver 41. The location is relayed by the transceiver 43 back to the user device 88. The user device 88 can then determine how far the youth recreational vehicle 2, 3 is from a designated location, which can be relayed back to the youth recreational vehicle 2, 3. And, based on the distance between the designated location and the youth recreational vehicle 2, 3, the controller 86 of the youth recreational vehicle 2, 3 can configure different maximum power outputs 144 of the youth recreational vehicle 2, 3. Additionally, or alternatively, the controller 86 can periodically send the location of the youth recreational vehicle 2, 3 to the user device 88, without the user device 88 pinging the youth recreational vehicle 2, 3 for its location.

According to certain embodiments, a user can increase or decrease the maximum operating distance 150. For example, by sliding an indicator 152 to the left, the max operating distance 150 is decreased and by sliding the indicator 141 to the right, the max operating distance 150 is increased.

Figure 10:
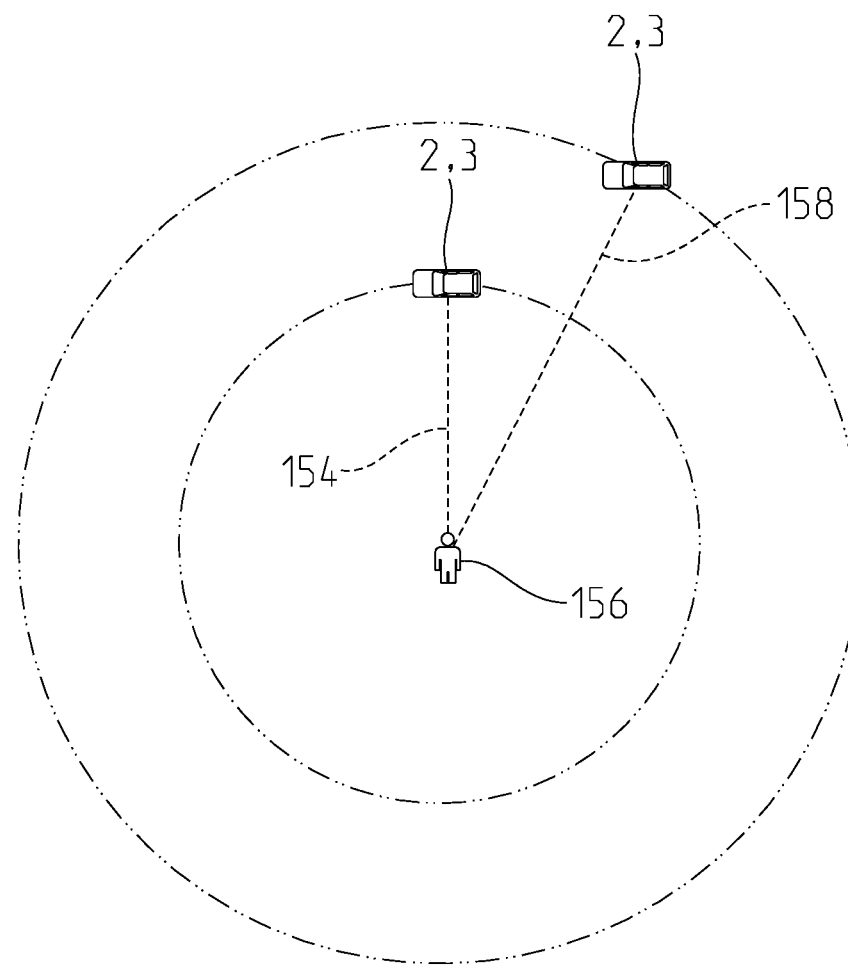
FIG. 10 is a diagram of a map illustrating geographic areas allowing different operation configurations for the youth recreational vehicle, in accordance with embodiments of the present disclosure.
Figure 11:
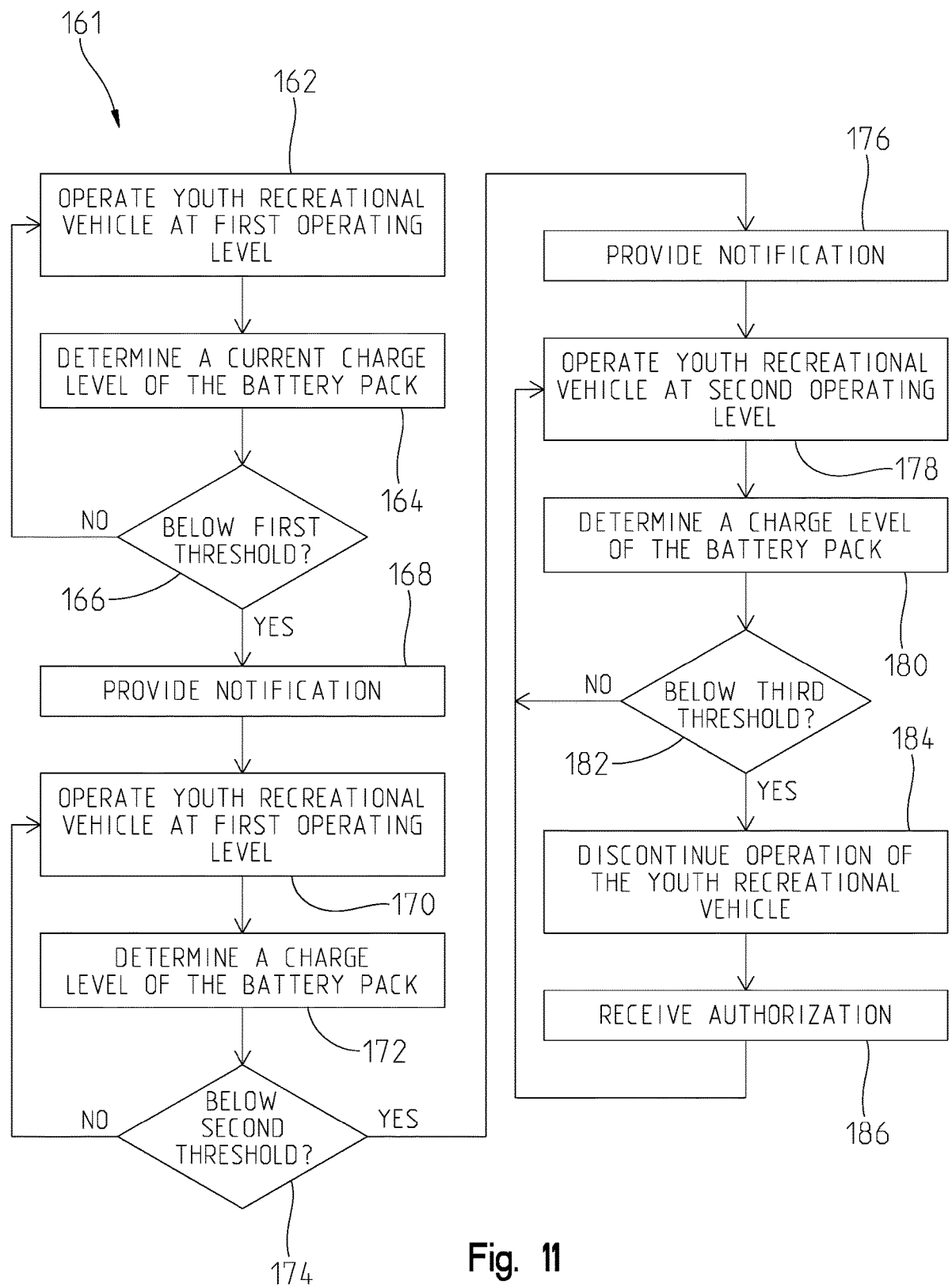
FIG. 11 is a flow diagram of a return home feature of a youth recreational vehicle, in accordance with embodiments of the present disclosure.

As an example, referring to FIG. 10, if the youth recreational vehicle 2, 3 is a first distance 154 from a designated location 156, the youth recreational vehicle 2, 3 max power output 144 can be at a first operating level (e.g., a normal operating level). However, if the youth recreational vehicle 2, 3 is a second distance 158 from a designated location 156, such that the second distance 158 is greater than the first distance 154, then the youth recreational vehicle 2, 3 max power output 144 can be at a second operating level (e.g., a reduced operating level). Further, in certain embodiments, if the youth recreational vehicle 2, 3 returns back to within the first distance 154 from a designated location 156, then the youth recreational vehicle 2, 3 max power output 144 can resume operating at the first operating level (e.g., a normal operating level). In embodiments where there is more than one designated location 156, the youth recreational vehicle 2, 3 can operate at a first operating level while the youth recreational vehicle 2, 3 is within the first distance 154 of one of the designated locations 156. Alternatively, in embodiments where there is more than one designated location 156, the youth recreational vehicle 2, 3 can operate at a first operating level only if the youth recreational vehicle 2, 3 is within the first distance 154 of all of the designated locations.

In some embodiments, if the youth recreational vehicle 2, 3 is greater than a first distance 154 from a designated location 156, the youth recreational vehicle 2, 3 can be provide another indication that the youth recreational vehicle 2, 3 should return to within the first distance 154 from the designated location 156. For example, the youth recreational vehicle 2, 3 can emit an auditory indication (e.g., a sound, beep, siren, music, etc.), a visual indication (e.g., a display of the youth recreational vehicle 2, 3 can display a notification, an LED can be illuminated, headlights can flash, etc.). Additionally, or alternatively, the user device 88 of a supervising person can receive a notification (e.g., a text) in response to the youth recreational vehicle 2, 3 being at a distance that is greater than the first distance 154 from the designated location 156. In some embodiments, the indication that is provided in response to the youth recreational vehicle 2, 3 being at a distance that is greater than the first distance 154 from the designated location 156 can be configurable by a supervising person.

In certain embodiments, a user can set the one or more designated locations 156 via the user interface 115. Examples of designated locations include, but are not limited to, the location of the user device 88 or another designated location, such as a home, a location of another recreational vehicle, and/or the like. Additionally, or alternatively, a user can set the first operating level and the second operating level. Examples of first operating levels include, but are not limited to, 100% of the max power output 144. Examples of second operating levels include, but are not limited to, a range between and including less than 100% of the max power output 144 and 0% of the max power output 144.

In certain embodiments, the electronic throttle control module 120 is able to receive and store different max operating distances 150 for different user profiles 140. As such, if a youth is younger and/or less experienced than another user, the max operating distance 150 can be configured and saved to the youth's profile to be less than an older and/or more experience youth. This way a parent or other supervising person does not have to remember to reduce the max operating distance 150 when different youths use the recreational vehicle 2, 3. Instead, a parent or other supervising person can select a youth's profile and the max operating distance 150 can automatically be configured upon selection of the youth's user profile.

By being able to configure the maximum power output 144 based on a distance from a designated location 156, a parent or other supervising person can better control a youth's use of the youth recreational vehicle 2, 3.

Wireless Shutdown

In aspects, the electronic throttle controller module 120 can allow a parent to shut off and/or disallow operation of the youth recreational vehicle 2, 3. For example, the user interface 115 can include a power symbol 160 that allows a parent or other supervising person to allow or disallow operation of the youth recreational vehicle 2, 3. That is, for example, when the power symbol 160 is shown having a first characteristic (e.g., being illuminated in a first color such as blue), the youth recreational vehicle 2, 3 is allowed to be operated by a youth. Conversely, when the power symbol 160 is shown as having a second characteristic (e.g., being illuminated in a second color such as red), the youth recreational vehicle 2, 3 is not allowed to be operated by a youth. In certain embodiments, the user can touch the power symbol 160 to allow or disallow the youth recreational vehicle 2, 3 from being operated. For example, in instances where the power symbol 160 indicates the youth recreational vehicle 2, 3 is allowed to be operated, a user can touch the power symbol 160. In response, the user device 88 sends a signal to the transceiver 43 to disallow operation of the youth recreational vehicle 2, 3. The transceiver 43 then relays the signal to the controller 86, which can send a signal to the electric motor 10 and/or the battery pack 9 to no longer output power so that the youth recreational vehicle 2, 3 cannot be operated. In certain aspects, after the electric motor 10 and/or the battery 9 no longer outputs power, the regenerative braking of the youth recreational vehicle 2, 3 can slow the youth recreational vehicle 2, 3 to a stop. In certain aspects, the controller 86 sends a confirmation signal to the transceiver 43 to confirm the youth recreational vehicle 2, 3 is not allowed to be operated. The transceiver 43 can relay the confirmation signal to the user device 88 as confirmation the operation of the youth recreational vehicle 2, 3 is disallowed.

Conversely, in instances where the power symbol 160 indicates the youth recreational vehicle 2, 3 is not allowed to be operated, a user can touch the power symbol 160. In response, the user device 88 sends a signal to the transceiver 43 to allow operation of the youth recreational vehicle 2, 3. The transceiver 43 then relays the signal to the controller 86, which can send a signal to the electric motor 10 and/or the battery pack 9 to output power so that the youth recreational vehicle 2, 3 can be operated. In certain aspects, the controller 86 sends a confirmation signal to the transceiver 43 to confirm the youth recreational vehicle 2, 3 is allowed to be operated. The transceiver 43 can relay the confirmation signal to the user device 88 as confirmation the operation of the youth recreational vehicle 2, 3 is allowed.

Youth Return Home

In aspects, the return home module 122 allows a parent or other supervisory person to enable reserve a portion of the charge of the battery pack 9 to reduce the likelihood the youth recreational vehicle 2, 3 unintentionally exhausts the charge of the battery pack 9, perhaps a long distance away from where the youth intends to stop using the youth recreational vehicle 2, 3 (e.g., the youth's home). For example, referring to FIG. 11, a flow diagram illustrating a method 161 for a youth return home feature that can be incorporated into the controller 86 of the youth recreational vehicle 2, 3.

In aspects, the method 161 includes operating a youth recreational vehicle at a first operating level (block 162). Examples of first operating levels include, but are not limited to, 100% of the max power output 144. According to certain aspects, the method 161 includes determining a current charge level of the battery pack (block 164). In instances, the controller 86 can periodically check the current charge level of the battery pack 9.

The method 161 then determines whether the current charge level of the battery pack is below a first threshold (block 166). The controller 86 can be programmed to compare the current charge level to the first threshold. Examples of a first threshold include, but are not limited to, a range between and including 50% charge remaining to 5% charge remaining in the battery pack 9. In instances, where the current charge level is above the first threshold, the method 161 can return to block 162. Conversely, if the current charge level is below the first threshold, the method 161 can proceed to block 168 where a notification can be provided as to the charge level of the battery pack 9. In instances, the notification is provided via the user interface 51 on the youth recreational vehicle 2, 3 and/or on the user interface 151 of the user device 88. In aspects, the notification can include, but is not limited to, a visual indicator (e.g., a flashing light), audio indicator (e.g., a sound), haptic feedback (e.g., the user device 88 vibrating), and/or the like.

In aspects, the method 161 continues by operating the youth recreational vehicle under the first operating level (block 170). The method 161 includes determining a charge level of the battery pack again (block 172) and determining whether the charge level of the battery pack is at or below a second threshold (block 174). The second threshold is less than the first threshold. Examples of a second threshold include, but are not limited to, a range between and including 25% charge remaining to 5% charge remaining in the battery pack 9. In instances, where the current charge level is above the second threshold, the method 161 can return to block 170. Conversely, if the current charge level is below the second threshold, the method 161 can proceed to block 176 where a notification is provided of the charge level of the battery pack. Similarly, the notification can include, but is not limited to, a visual indicator (e.g., a flashing light), audio indicator (e.g., a sound), haptic feedback (e.g., the user device 88 vibrating), and/or the like. Further, the method 161 continues to block 178 where the youth recreational vehicle 2, 3 is operated under a second operating level. In aspects, the second operating level is a reduced operating level compared to the first operating level. Examples of second operating levels include, but are not limited to, a range between and including less than 100% of the max power output 144 and 0% of the max power output 144.

In aspects, the method 161 further includes determining a charge level of the battery pack (block 180) and determining whether the charge level is below a third threshold (block 182). The third threshold is less than the second threshold. Examples of a third threshold include, but are not limited to, a range between and including 10% charge remaining to 5% charge remaining in the battery pack 9. In aspects, the third threshold is greater than 0% charge remaining in the battery pack 9 to allow a parent or supervisory person to access the remaining power, as discussed below. In instances, where the current charge level is above the third threshold, the method 161 can return to block 178. Conversely, if the current charge level is below the third threshold, the method 161 can proceed to block 184 where operation of the youth recreational vehicle 2, 3 is not allowed. For example, the controller 86 can send a signal to the electric motor 10 and/or the battery pack 9 to no longer output power so that the youth recreational vehicle 2, 3 cannot be operated. In certain aspects, after the electric motor 10 and/or the battery 9 no longer outputs power, the regenerative braking of the youth recreational vehicle 2, 3 can slow the youth recreational vehicle 2, 3 to a stop.

According to certain embodiments, the method 161 can proceed to block 186 where authorization is requested and received to access the charge remaining in the battery pack 9. Examples of authorization include, but are not limited to, a password, pin code, and/or the like. Once authorization is received, the method 161 can proceed back to block 178 where the youth recreational vehicle 2, 3 is allowed to operate at the second operating level. This allows the youth recreational vehicle 2, 3 to try to return to a designate location (e.g., home) on whatever remaining charge is left in the battery pack 9.

Figure 12:
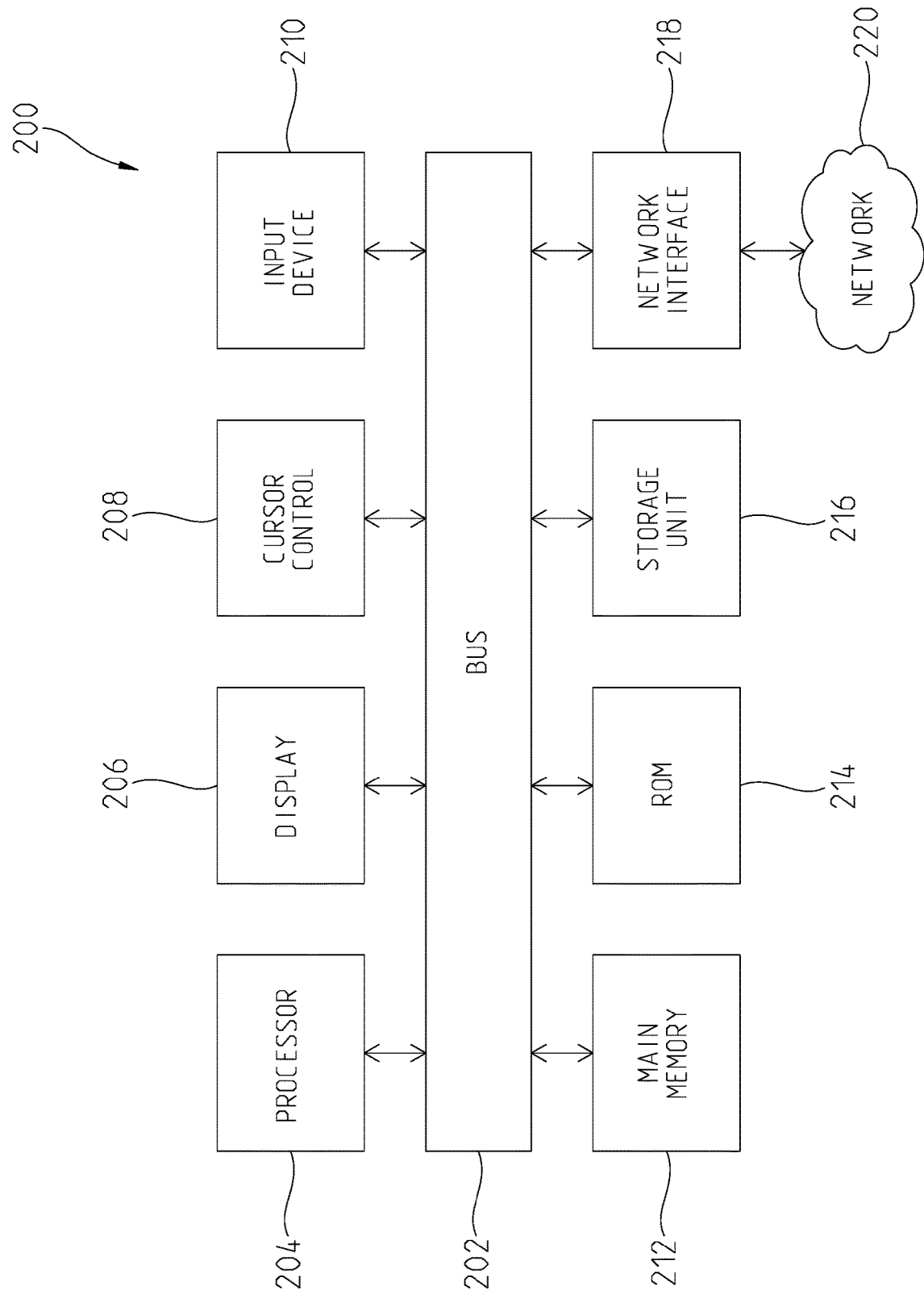
FIG. 12 is a block diagram of an exemplary computer architecture, in accordance with embodiments of the present disclosure.

FIG. 12 illustrates a diagram of a computing system 200 for implementing the system 109, controller 86, and/or method 161. For example, some or all of the functions of the user device 88 (e.g., youth vehicle application 114, locking module 116, charge indicator module 118, electronic throttle control module 120, and/or return home module 122) may be performed by a computing system that has similar components as the computing system 200. This diagram is merely an example, which should not unduly limit the scope of the claims. One of ordinary skill in the art would recognize many variations, alternatives, and modifications.

The computing system 200 includes a bus 202 or other communication mechanism for communicating information between, a processor 204, a display 206, a cursor control component 208, an input device 210, a main memory 212, a read only memory (ROM) 214, a storage unit 216, and/or a network interface 218. In some examples, the bus 202 is coupled to the processor 204, the display 206, the cursor control component 208, the input device 210, the main memory 212, the read only memory (ROM) 214, the storage unit 216, and/or the network interface 218. And, in certain examples, the network interface 218 is coupled to a network 220 (e.g., the network 112).

In some examples, the processor 204 includes one or more general purpose microprocessors. In some examples, the main memory 212 (e.g., random access memory (RAM), cache and/or other dynamic storage devices) is configured to store information and instructions to be executed by the processor 204. In certain examples, the main memory 212 is configured to store temporary variables or other intermediate information during execution of instructions to be executed by processor 204. For example, the instructions, when stored in the storage unit 216 accessible to processor 204, render the computing system 200 into a special-purpose machine that is customized to perform the operations specified in the instructions (e.g., the components 114-122). In some examples, the ROM 214 is configured to store static information and instructions for the processor 204. In certain examples, the storage unit 216 (e.g., a magnetic disk, optical disk, or flash drive) is configured to store information and instructions.

Thus, computing system 200 may include at least some form of computer readable media. The computer readable media may be any available media that can be accessed by processor 204 or other devices. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may not include communication media.

In some embodiments, the display 206 (e.g., a cathode ray tube (CRT), an LCD display, or a touch screen) is configured to display information to a user of the computing system 200. In some examples, the input device 210 (e.g., alphanumeric and other keys) is configured to communicate information and commands to the processor 204. For example, the cursor control 208 (e.g., a mouse, a trackball, or cursor direction keys) is configured to communicate additional information and commands (e.g., to control cursor movements on the display 206) to the processor 604.

Energy Sharing

Figure 13:
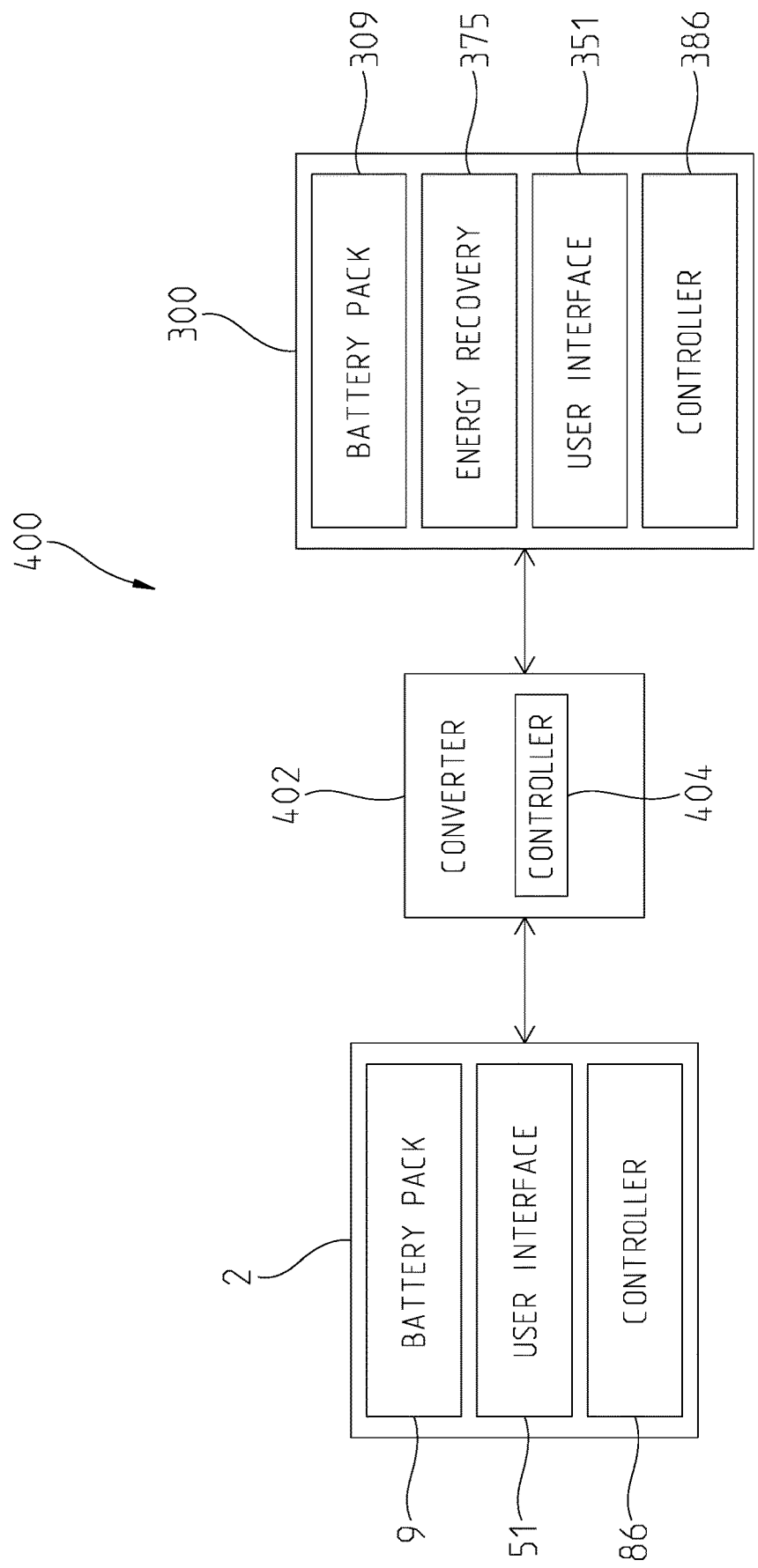
FIG. 13 is a block diagram of a connection between vehicles of the present disclosure.

Now referring to FIG. 13, the vehicle 2 may also include a charging system 400 which may transfer energy between battery pack(s) 9 and a battery pack 309 of an additional vehicle 300. In the present embodiment, battery pack 309 has a greater capacity and/or greater power than battery pack 9. In various embodiments, battery pack 309 may be a 100 VDC (Volts of Direct Current) battery, and battery pack 9 is a 48 VDC battery. Battery pack 9 may be selectively and electrically coupled to battery pack 309. Any portion of battery pack 9, in total or individually, including battery module(s) 9a, 9b, 9c, may include, or be coupled to, a connection port configured to receive an electrical connection from battery pack 309. Further, battery pack 309 may include a connection port, and the connection port of battery pack 309 and the connection port of battery pack 9 may be electrically coupled.

Charging system 400 also includes a converter 402 to convert the voltage as it is transferred between battery 9 and battery 309. In the present embodiment, converter 402 is a Buck-Boost converter capable of DC-DC voltage conversion. In various configurations, converter 402 receives power from the higher voltage battery pack 309) at a first voltage level and converts it into power at a lower, second voltage level to be received by battery pack 9). converter 402 receives 100 VDC power from the higher voltage battery pack 309 and converts it into 48 VDC power to be received by battery pack 9. In various configurations, converter 402 receives power from the lower voltage battery pack 9 at a first voltage level and converts it into power at a higher, second voltage level to be received by battery pack 309. In one configuration, converter 402 receives 48 VDC power from the lower voltage battery pack 9 and converts it into 100 VDC power to be received by battery pack 309.

Converter 402 may be a separate component, physically spaced from battery pack 9, vehicle 2, battery pack 309, and vehicle 300. An advantage of separating converter 402 from vehicle 2 and vehicle 300 is that a user may utilize converter 402 with a variety of charging systems. In various embodiments, converter 402 may be built into battery pack 9 of youth recreational vehicle 2 or battery pack 309 of additional vehicle 300. In various embodiments, converter 402 may be coupled to, or supported by, a frame of vehicle 2 or vehicle 300. An advantage of including converter 402 within vehicle 2 or vehicle 300 is that a user need not store or pack converter 402 elsewhere.

Vehicle 2 may be placed on vehicle 300 or may be placed in a bed or storage area (not shown) of vehicle 300. Vehicle 300 may have sensors, such as weight sensors (not shown), optical sensors, or shock position sensors (not shown), configured to determine if vehicle 2 is within the bed or storage area of vehicle 300. That is, weight sensors may be placed in a bed or storage area of vehicle 300 to detect when a weight threshold is reached, or shock position sensors may monitor a change in position of shocks when vehicle 300 is not moving to determine if a weight threshold is reached. The weight threshold may be preset by a user, or otherwise preset by network 112, a mobile device, or other information source. The weight threshold may also be configurable by a user using a mobile device, network 112, or user interface 351 of vehicle 300, or user interface 51 of vehicle 2. If the weight threshold is met, a user interface 51 of vehicle 2 or a user interface 351 of vehicle 300 may inquire if vehicle 2 is ready to be charged by vehicle 300. A user may then select on either user interface 51 or user interface 351 to start the power transfer sequence as detailed above.

In various embodiments, when vehicle 2 is electrically coupled to vehicle 300 using converter 402, a controller 86 of vehicle 2 may automatically start charging battery pack 9 of vehicle 2 using battery pack 309 of vehicle 300. In various embodiments, a controller 386 of vehicle 300 may automatically start charging battery pack 309 of vehicle 300 using battery pack 9 of vehicle 2. In various embodiments, controller 86 may communicate with controller 386, and may determine which vehicle 2, 300 has the lowest battery charge and start the battery charging process to charge the lower charged vehicle. In various embodiments, the lowest battery charge may be determined as a percentage of total capacity or a total power level. In various embodiments, a controller 404 of converter 402 determines which battery has the lowest battery charge and provides power from the higher charged battery to the lower charged battery. In various embodiments, both vehicle 2 and vehicle 300 include a switch (not shown) configured to start the power transfer in a certain direction. In one embodiment, a user actuates the switch of vehicle 2, and in response to the switch being actuated, battery pack 309 of vehicle 300 provides power through converter 402 to battery pack 9 of vehicle 2. In another embodiment, a user actuates the switch of vehicle 300, and in response to the switch being actuated, battery pack 9 of vehicle 2 provides power through converter 402 to battery pack 309 of vehicle 300. In various embodiments the switch is a bidirectional switch so that the flow of power can be selected from either vehicle. In various embodiments, a unidirectional switch or a bidirectional switch is included on converter 402 so that a user may control power flow from the converter 402 between vehicles 2, 300.

In various embodiments, battery pack 9 may be used as a range extender or a backup battery for battery pack 309. Vehicle 2 may be placed in a bed or storage area of vehicle 300 and coupled to vehicle 300 using charging system 400. Power from battery pack 9 may then flow to battery pack 309 as vehicle 300 is moving so that vehicle 300 may have a longer range, or in the event that battery pack 309 is completely discharged, an additional amount of power to get to a specific destination (e.g., home). In various embodiments, if controller 386 determines that the battery pack 309 is completely discharged, but coupled to battery pack 9, or if battery pack 309 is at a substantially low charge level, controller 386 may place vehicle 300 into an energy saver mode, or a "limp home" mode. Controller 386 may then control vehicle 300 in a most energy efficient manner to conserve battery charge and provide maximum range to vehicle 300. For example, controller 386 may alter a pedal map, or a throttle map, so that high acceleration and/or high torque events are reduced. In various embodiments, a user of vehicle 300 may store vehicle 2 within the bed or storage of area of vehicle 300 so that battery pack 9 of vehicle 2 may charge while vehicle 300 is in motion. If vehicle 2 and vehicle 300 are both on a trail, or at a campsite, vehicle 2 may be placed in the bed of vehicle 300, and while vehicle 300 is in motion, charging system 400 may transfer power from battery pack 309 to battery pack 9. In various embodiments, vehicle 300 is equipped with various forms of power regeneration or energy recovery 375, including, but not limited to regenerative braking, suspension energy recovery, or the like. To conserve power within battery pack 309, controller 386 may instruct only power recovered from power regeneration be provided to battery pack 9.

Controllers 86, 386 and 404 may each be operably coupled to the network 112, a display 51, 351, or a mobile device. A user may provide instructions to any of controllers 86, 386, 404 to start, stop, change the direction of charging, or change the speed of charging taking place in charging system 400 over network 112. Instructions to controllers 86, 386, 404 may come from a mobile device, a network server, a network administrator, or the like. Additionally, a user may couple directly to, and provide instructions to, the controller 404 of converter 402 using a wireless signal such as WiFi or Bluetooth Low Energy (BTLE) through a mobile device or a computer. Further, a user may provide instructions to controller 86 on user interface 51 of vehicle 2, or provide instructions to controller 386 on user interface 351 of vehicle 300. The instructions provided to a user interface may include starting a charging sequence, stopping a charging sequence, altering a speed of a charging sequence, changing a direction of a charging sequence, or a combination thereof.

Youth Vehicle Noise Emitter

Vehicle 2 may include a noise emitter, or noise generator, coupled to the controller 86. Noise emitter may be of a car horn type, may generally be speakers, or may be a noise generating circuit. Noise emitter may produce noises that resemble a constant engine speed, an engine acceleration, an engine deceleration, a horn, an exhaust, an ignition cycle, other typical internal combustion engine noises, and other typical vehicle noises. Further, the noise emitter may produce user specified noises. Vehicle 2 may include preset noises stored within computing system 200 from which a user may choose. Additionally, a user may upload preset noises to the computing system 200 from a mobile device, a memory stick (e.g., USB Drive), network 112, or other source. In various embodiments, vehicle 2 may include a microphone, or may be coupled to a microphone on a user garment, such as a helmet, that may record audio to be stored as a selectable noise in computing system 200. In various embodiments, user may select noises from network 112 to be downloaded to computing system 200 of vehicle 2.

User interface 51 may provide a menu with vehicle functions, or user actions, and a user may map a sound stored in computing system 200 or network 112 to various vehicle functions or user actions. In one example, a user may select that when vehicle 2 proceeds through a start sequence, the noise emitter produces a sound similar to an internal combustion engine starting. In another example, a user may provide instructions so that when vehicle 2 is in an on state, the noise emitter produces an engine idling noise, and if vehicle 2 accelerates, an engine acceleration noise is produced. A user may only select and/or change noises for the noise emitter to produce when vehicle 2 is not turned on or when vehicle 2 is not moving.

Vehicle 2 may further include geofencing capabilities. That is, a limited range of operation determined via a mobile device, network 112, or other wireless source. Additional details regarding geofencing capabilities can be found in U.S. Pat. No. 10,809,741, issued Oct. 20, 2020, titled METHOD AND SYSTEM FOR CONTROLLING THE SPEED OF A VEHICLE; U.S. application Ser. No. 15/836,223, filed Dec. 8, 2017, titled DEVICE AND METHOD OF SUPERVISING AND MODIFYING VEHICLE OPERATION, the complete disclosures of which are expressly incorporated by reference herein. In one embodiment, if vehicle 2 approaches the edge of a preset boundary, controller 86 will instruct the noise emitter to produce a noise to alert the operator of vehicle 2 that they are approaching the boundary. In another embodiment, if vehicle 2 proceeds to pass by the boundary, controller 86 will instruct the noise emitter to produce a more severe noise (i.e., louder or higher frequency) to alert the operator they have passed by the boundary.

Figure 14:
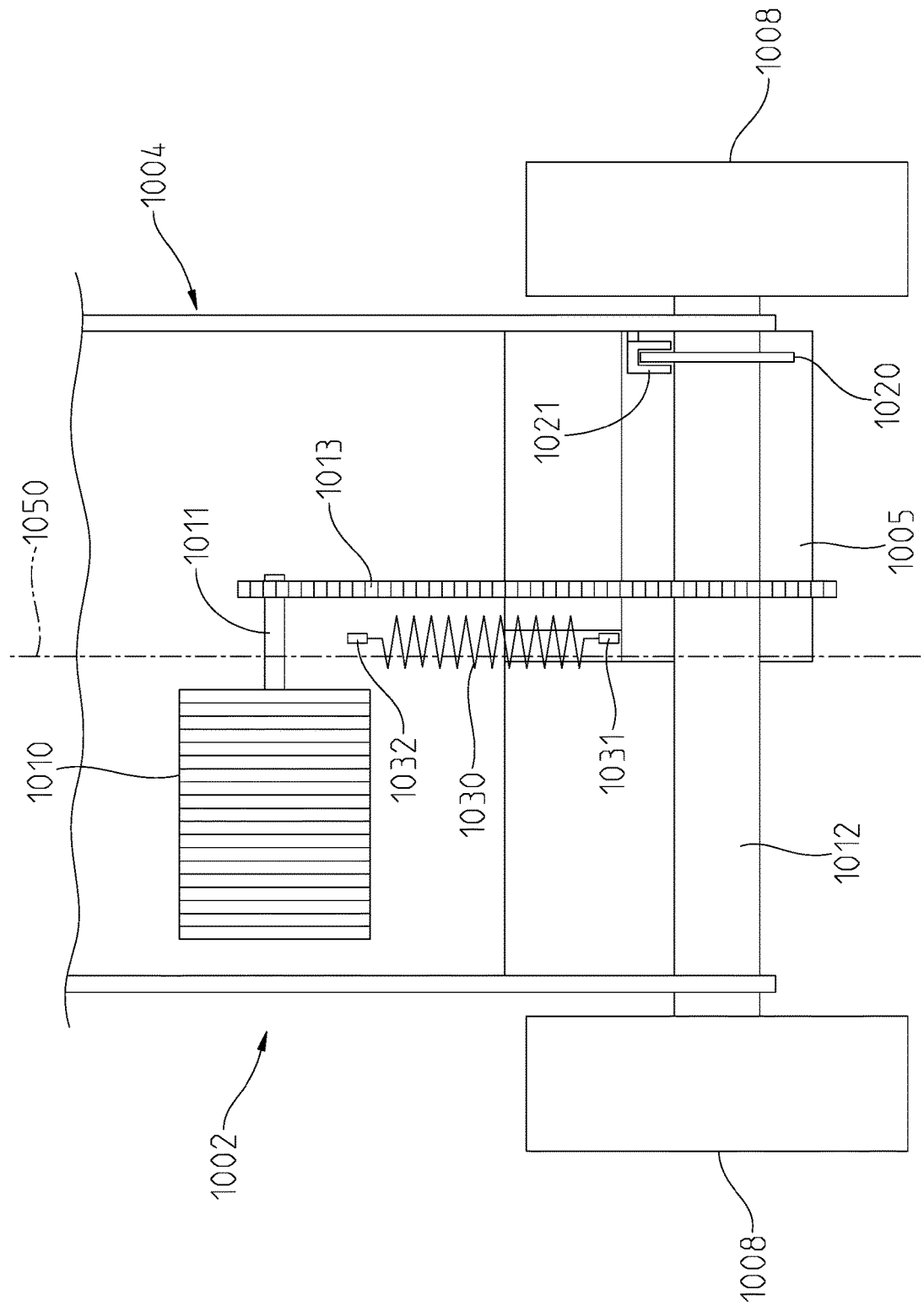
FIG. 14 is a conceptual diagram of a portion of a vehicle of the present disclosure.
Figure 15:
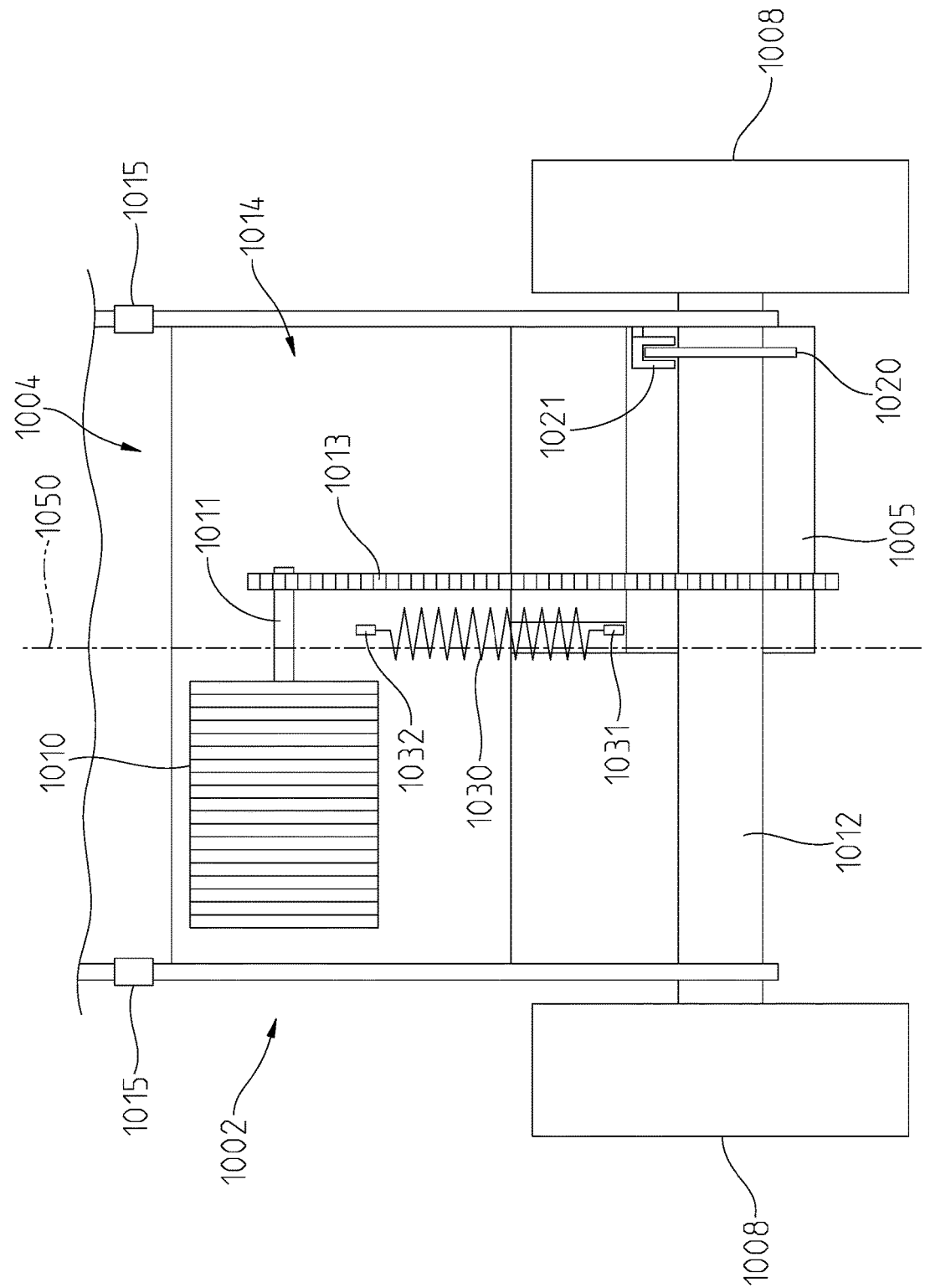
FIG. 15 is a conceptual diagram of a portion of a vehicle of the present disclosure.

Referring now to FIGS. 14-15, a vehicle 1002 will be described. Vehicle 1002 may include components, systems, or other technology which, for the intent of this disclosure, are compatible with vehicle 2. Similarly, the hereinbefore disclosure pertaining to vehicle 2 should be considered generally compatible with vehicle 1002.

Referring to FIGS. 14-15, vehicle 1002 comprises many similar features and/or components to that of vehicle 2, and may only differ in the components described in FIG. 14-15. Vehicle 1002 includes a pair of rear ground engaging members 1008 coupled by a rear axle 1012. Vehicle 1002 includes a frame 1004 configured to be supported by at least ground engaging members 1008 and is coupled to rear axle 1012 at either lateral extent of rear axle 1012, at a position laterally adjacent and laterally inward of an inner surface of rear ground engaging members 1008. Frame 1004 supports, among other things, a motor 1010 at a position generally forward of rear ground engaging members 1008. Motor 1010 is laterally offset from a vehicle centerline 1050 and comprises a drive shaft 1011 extending inwardly towards and/or intersecting with vehicle centerline 1050, and the rotational axis of the drive shaft 1011 is positioned generally perpendicular to vehicle centerline 1050. Drive shaft 1011 also includes a sprocket (not shown) disposed generally at an outer end of drive shaft 1011 and positioned away from motor 1010. Rear axle 1012 supports a sprocket (not shown) at a position longitudinally rearward of the sprocket on drive shaft 1011. The sprockets may comprise various diameters, numbers of teeth, or other gear characteristics to support various gear ratios. A chain 1013 extends between the sprocket of drive shaft 1011 and the sprocket of rear axle 1012.

Vehicle 1002 further comprises a brake rotor 1020 coupled to drive shaft 1012. A brake caliper 1021 is coupled to frame 1004 and positioned to interface with rotor 1020 and provide braking power to vehicle 1002. Illustratively, rotor 1020 is positioned laterally inward from the coupling points of frame 1004 with rear axle 1012. Brake caliper 1021 receives hydraulic fluid and pressure from a master cylinder (not shown) and is included in the overall braking system of vehicle 2, 1002. In other embodiments, brake caliper 1021 may be electronically or otherwise controlled.

Vehicle 1002 also includes a support frame 1005 configured to protect brake rotor 1020, rear axle 1012, and the sprocket on the rear axle. Further, support frame 1005 includes a mounting point 1031 for coupling with a biasing member 1030. More particularly, a lower end of biasing member 1030 is coupled to support frame 1005 at mounting point 1031. Biasing member 1030 may be a shock absorber, a spring, a strut, or other type of linear force element or biasing member. An upper end of biasing member 1030 is coupled to frame 1004 at a mounting point 1032. Mounting point 1032 is positioned on an upper frame member (not shown). Mounting point 1032 is vertically higher than motor 1010, and biasing member 1030 is configured to provide damping force between ground engaging members 1008 and frame 1004. Illustratively, biasing member 1030 is at least partially aligned at a position laterally between chain 1013 and motor 1010. In various embodiments, biasing member 1030 is positioned along vehicle centerline 1050. In the present embodiment, motor 1010 is positioned substantially on the left side of vehicle 1002 and is laterally offset from biasing member 1030, and drive shaft 1011 extends to the right, past biasing member 1030. Chain 1013 extends rearwardly from the sprocket of drive shaft 1011. Additionally, chain 1013 extends rearwardly beyond the right side of biasing member 1030 and connects to the sprocket of the rear axle 1012. In the present embodiment, biasing member 1030 is positioned at a generally laterally intermediate position of vehicle 1002 and, as such, may be generally aligned with vehicle centerline 1050 or positioned immediately adjacent thereto such that biasing member 1030 may not be substantially offset from vehicle centerline 1050. In various embodiments, motor 1010 may be positioned on the right side of vehicle 1002 where drive shaft 1011 would then extend to the left past biasing member 1030. Chain 1013 extends rearwardly, along a left side of biasing member 1030 and couples to sprocket of rear axle 1012, which is positioned directly rearward of the sprocket of drive shaft 1011.

Referring to FIG. 15, vehicle 1002 may include a subframe 1014. Subframe 1014 is supported by rear ground engaging members 1008 and is coupled to frame 1004 by couplers 1015. In the present embodiment, couplers 1015 are rotary joints and allow subframe 1014 to rotate in a vertical direction about a lateral axis relative to frame 1004. Vehicle 1002 includes biasing member 1030 coupled to subframe 1014 at lower mounting point 1031 and coupled to frame 1004 at upper mounting point 1032. Lower mounting point 1031 is positioned on subframe 1014, rearward of motor 1010 and forward of rear axle 1012. Upper mounting point 1032 is positioned on frame 1004, vertically higher than motor 1010 and subframe 1014. Biasing member 1030 dampens the relative rotational movement between subframe 1014 and frame 1004. Illustratively, biasing member 1030 is at least partially aligned at a position laterally between chain 1013 and motor 1010. In various embodiments, biasing member 1030 is positioned along the vehicle centerline 1050. In the present embodiment, motor 1010 is positioned substantially on the left side of vehicle 1002 and is laterally offset from biasing member 1030, and drive shaft 1011 extends to the right, past biasing member 1030. Chain 1013 extends rearwardly from the sprocket of drive shaft 1011. Additionally, chain 1013 extends rearwardly beyond the right side of biasing member 1030 and connects to the sprocket of the rear axle 1012. In the present embodiment, biasing member 1030 is positioned at a generally laterally intermediate position of vehicle 1002 and, as such, may be generally aligned with vehicle centerline 1050 or positioned immediately adjacent thereto such that biasing member 1030 may not be substantially offset from vehicle centerline 1050. In various embodiments, motor 1010 may be positioned on the right side of vehicle 1002 where drive shaft 1011 would then extend to the left past biasing member 1030. Chain 1013 extends rearwardly, along a left side of biasing member 1030 and couples to sprocket of rear axle 1012, which is positioned directly rearward of the sprocket of drive shaft 1011.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A youth recreational vehicle, comprising:
a pair of front ground engaging members;
a pair of rear ground engaging members;
a frame supported by the one or more front ground engaging members and the one or more rear ground engaging members;
a seat supported by the frame and configured to support at least one rider; and
an electric powertrain configured to drive at least one of: (i) the one or more front ground engaging members and (ii) the one or more rear ground engaging members, the electric powertrain comprising: a controller, at least one electric motor having an electric motor output shaft, a drive member operably coupled between the electric motor and at least one ground engaging member of the pair of front ground engaging members and the pair of rear ground engaging members, and at least one battery pack; and
the electric motor is positioned entirely laterally offset on a first side of a vehicle centerline, the electric motor output shaft extending transverse to the vehicle centerline, and the entire drive member is laterally offset on a second side of the vehicle centerline opposite the first side.

2. The youth recreational vehicle of claim 1, wherein the at least one battery pack is arranged proximal a center portion of the frame.

3. The youth recreational vehicle of claim 1, wherein the at least one battery pack is arranged proximal the one or more rear ground engaging members.

4. The youth recreational vehicle of claim 1, wherein the at least one battery pack is accessible via a lockable access panel.

5. The youth recreational vehicle of claim 1, wherein the controller is configured to:
receive a signal from a user device to stop power output of the at least one electric motor; and
send a signal to the electric motor to stop outputting power in response to a throttle signal.

6. The youth recreational vehicle of claim 1, further comprising a docking station releasably coupled to the youth recreational vehicle, wherein the docking station receives a first power output from the at least one battery pack and converts the first power output to a second power output that can be used by an accessory device.

7. The youth recreational vehicle of claim 1, further comprising:
a front suspension coupled to the one or more front ground engaging members;
a rear suspension to the one or more rear ground engaging members; and
wherein the front suspension, the rear suspension, or the front suspension and the rear suspension are configured to send an electromotive force to the battery pack in response to (i) the one or more front ground engaging members moving in an upward or downward direction and/or (ii) the one or more rear ground engaging members moving in an upward or downward direction.

8. The youth recreational vehicle of claim 1, further comprising an electronic throttle control configured to send a throttle signal to the controller in response to a user activating the throttle.

9. The youth recreational vehicle of claim 1, wherein the at least one battery pack comprises configurable battery modules.

10. The youth recreational vehicle of claim 1, wherein the controller is configured to send a signal to the at least one motor to disengage in response to receiving a freewheel signal.

11. The youth recreational vehicle of claim 1, the controller is further configured to:
receive a tether signal indicating a user has released at least one of the user's hands from the steering assembly; and
send a signal to the at least one motor to disengage so the at least one motor no longer outputs power.

12. The youth recreational vehicle of claim 1, wherein the controller is further configured to:
receive a charge signal from the at least one battery pack corresponding to a charge level of the battery pack; and
transmit a signal to a user device corresponding to the charge level of the battery pack.

13. The youth recreational vehicle of claim 1, wherein the controller is further configured to:
receive a power output signal from a user device; and
configure a maximum power output of the at least one electric motor based upon the received power output signal.

14. The youth recreational vehicle of claim 1, further comprising:
a steering assembly configured to control a direction of the one or more front ground engaging members;
at least one of a footwell or pegs arranged on each side of the youth recreational vehicle; and
wherein at least one of the following is translatable in a horizontal direction, a vertical direction, and/or a diagonal direction: the steering assembly, the seat, the footwells, and the pegs.

15. The youth recreational vehicle of claim 1, wherein the one or more front ground engaging members and the one or more rear ground engaging members are swappable with larger diameter or smaller diameter ground engaging members.

16. The youth recreational vehicle of claim 1, further comprising:
a front suspension coupled to the one or more front ground engaging members;

a rear suspension to the one or more rear ground engaging members; and wherein the front suspension, the rear suspension, or both the front suspension and the rear suspension are swappable with stiffer or more flexible suspensions.

17. The youth recreational vehicle of claim 1, wherein the controller is further configured to:
receive a charge signal from the at least one battery pack corresponding to a charge level of the battery pack;
determine the charge level is at or below a first threshold;
send a signal to the at least one motor to operate at a first operating level; and
provide a notification to a user device that the charge level is at least or below the first threshold.

18. The youth recreational vehicle of claim 17, wherein the controller is further configured to:
receive a charge signal from the at least one battery pack corresponding to a charge level of the battery pack;
determine the charge level is at or below a second threshold;
send a signal to the at least one motor to operate at a second operating level, wherein the second operating level produces a lower max power output than the first operating level; and
provide a notification to the user device that the charge level is at least or below the second threshold.

19. The youth recreational vehicle of claim 18, wherein the controller is further configured to:
receive a charge signal from the at least one battery pack corresponding to a charge level of the battery pack;
determine the charge level is at or below a third threshold; and
send a signal to the at least one motor to stop power output of the at least one motor.

20. The youth recreational vehicle of claim 19, wherein the controller is further configured to:
receive an authorization signal from the user device; and
send a signal to the at least one motor to operate at a second operating level.

21. The youth recreational vehicle of claim 1, wherein the electric powertrain is scalable.

22. The youth recreational vehicle of claim 1, wherein the youth recreational vehicle is a side-by-side.

23. The youth recreational vehicle of claim 1, further comprising a biasing member operably coupled between the frame and a first ground engaging member of the pair of front ground engaging members and pair of rear ground engaging members, and the biasing member extends along the vehicle centerline.

24. The youth recreational vehicle of claim 1, further comprising a rear axle extending between the pair of rear ground engaging members, and a biasing member operably coupled between the frame and the rear axle, and the electric motor is positioned on a first lateral side of the biasing member and the drive member is positioned on a second lateral side of the biasing member opposite the first lateral side.

25. The youth recreational vehicle of claim 1, wherein the electric motor comprises an electric motor output extending generally laterally outwardly from the electric motor, and the drive member engages the electric motor output.

26. A youth recreational vehicle, comprising:
a pair of front ground engaging members;
a pair of rear ground engaging members;
a frame supported by the one or more front ground engaging members and the one or more rear ground engaging members, the frame extending along a longitudinal centerline;
a rear axle extending between the pair of rear ground engaging members;
a biasing member extending between the rear axle and the frame;
a seat supported by the frame and configured to support at least one rider; and
an electric powertrain configured to drive at least one of:
(i) the one or more front ground engaging members and
(ii) the one or more rear ground engaging members, the electric powertrain comprising: a controller, at least one electric motor, a drive member operably coupled between the at least one electric motor and the rear axle, and at least one battery pack, wherein the electric motor is an axial flux electric motor; and
the electric motor is positioned laterally offset on a first side of the biasing member, and the drive member is laterally offset on the second side of the biasing member opposite the first side and the biasing member is coupled to the rear axle completely rearwardly of the electric motor.

27. A youth recreational vehicle, comprising:
a pair of front ground engaging members;
a pair of rear ground engaging members;
a frame supported by the one or more front ground engaging members and the one or more rear ground engaging members;
a rear axle coupled between the pair of rear ground engaging members;
a biasing member extending between the frame and the rear axle;
a seat supported by the frame and configured to support at least one rider; and
an electric powertrain configured to drive at least one of:
(i) the one or more front ground engaging members and
(ii) the one or more rear ground engaging members, the electric powertrain comprising: a controller, at least one electric motor, and at least one battery pack, wherein the at least one battery pack is arranged proximal a center portion of the frame; and
the biasing member is laterally aligned with a portion of the electric powertrain and coupled to the frame at a position vertically higher than the electric motor.

* * * * *